US012809291B2

(12) United States Patent
Kashiide et al.

(10) Patent No.: US 12,809,291 B2
(45) Date of Patent: Nov. 24, 2026

(54) DEVELOPING APPARATUS AND IMAGE FORMING APPARATUS

(71) Applicant: CANON KABUSHIKI KAISHA, Tokyo (JP)

(72) Inventors: Yosuke Kashiide, Tokyo (JP); Toshiaki Takeuchi, Shizuoka (JP); Naoki Fukushima, Shizuoka (JP); Tetsuo Uesugi, Shizuoka (JP); Shuichi Gofuku, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/069,319

(22) Filed: Mar. 4, 2025

(65) Prior Publication Data

US 2025/0284225 A1 Sep. 11, 2025

(30) Foreign Application Priority Data

Mar. 6, 2024 (JP) ................................ 2024-033700

(51) Int. Cl.
*G03G 15/08* (2006.01)

(52) U.S. Cl.
CPC ..... *G03G 15/0889* (2013.01); *G03G 15/0877* (2013.01)

(58) Field of Classification Search
CPC ........... G03G 15/0822; G03G 15/0865; G03G 15/0877; G03G 15/0889
See application file for complete search history.

(56) References Cited

U.S. PATENT DOCUMENTS

| | | | | |
|---|---|---|---|---|
| 11,392,057 B2 | 7/2022 | Kamoshida et al. | | |
| 11,669,038 B2 | 6/2023 | Kawakami et al. | | |
| 2012/0033997 A1* | 2/2012 | Fujita | G03G 15/0877 | 399/258 |
| 2016/0124347 A1* | 5/2016 | Isobe | G03G 15/0874 | 399/109 |
| 2023/0418180 A1* | 12/2023 | Sunahara | G03G 15/0856 | |
| 2025/0164909 A1 | 5/2025 | Takeuchi et al. | | |

FOREIGN PATENT DOCUMENTS

| | | |
|---|---|---|
| JP | 2001-194883 A | 7/2001 |
| JP | 2009-134052 A | 6/2009 |
| JP | 2018-077458 A | 5/2018 |

* cited by examiner

*Primary Examiner* — Carla J Therrien

(74) *Attorney, Agent, or Firm* — VENABLE LLP

(57) ABSTRACT

A developing apparatus includes a developer roller for bearing a developer, a supply roller for supplying the developer to the developer roller, a development chamber including the developer roller and the supply roller arranged therein, and a developer accommodation chamber for accommodating the developer. A stirring unit stirs the developer accommodated in the developer accommodation chamber. The developer accommodation chamber is set at a top in a gravity direction of the development chamber in a posture in which the developing apparatus is mounted in an image forming apparatus, and the developer roller, the supply roller, and the stirring unit rotate around a rotation axis along a longitudinal direction of the developing apparatus. A wall surface partitions the developer accommodation chamber and the development chamber and has an opening for enabling a movement of the developer from the developer accommodation chamber to the development chamber in the longitudinal direction.

6 Claims, 31 Drawing Sheets

DEVELOPING APPARATUS AND IMAGE FORMING APPARATUS

BACKGROUND OF THE INVENTION

Field of the Invention

The present invention relates to a developing apparatus and an image forming apparatus.

Description of the Related Art

An image forming apparatus for forming an image on a recording medium using an electrophotographic image forming system is known. Examples of the image forming apparatus may include an electrophotographic copier, an electrophotographic printer (such as a LED printer or a laser beam printer), a facsimile device, and a word processor.

Japanese Patent Application Publication No. 2001-194883 discloses a development unit configuration having a development chamber in which a development roller and a supply roller are set, and a developer accommodation chamber for accommodating a developer (toner) therein. In Japanese Patent Application Publication No. 2001-194883, in the developer accommodation chamber provided at the top of the development chamber, a stirring member for stirring a developer is set.

When in the development unit as in Japanese Patent Application Publication No. 2001-194883, or a process cartridge including the same, the developer amount is increased due to an increase in volume, or a developer having a heavy specific gravity is used, the developer in the developer accommodation chamber becomes more likely to be pushed into the development chamber set at the lower part due to its own weight of the developer and the movement of the stirring member, resulting in a dense state of the developer in the development chamber. As a result, the poor circulation of the developer in the development chamber is caused, so that the functions of the development roller and the supply roller are impaired. This may result in the occurrence of a harmful effect on an image such as toner leakage. Under such circumstances, conventionally, the developer accommodation chamber has been set in a lying posture in the direction horizontal with the development chamber, thereby preventing its own weight of the developer from being imposed. However, when the developer accommodation chamber is set in a lying posture, an increase in size of the apparatus may be caused.

SUMMARY OF THE INVENTION

The present invention was completed in view of the foregoing problem. It is an object of the present invention to circulate a developer in a development unit properly.

The present invention provides a developing apparatus configured to comprise:

- a developer bearing member for bearing a developer;
- a supply member for coming in contact with the developer bearing member, thereby forming a contact region, and supplying the developer to a surface of the developer bearing member in the contact region;
- a development chamber including the developer bearing member and the supply member arranged therein;
- a developer accommodation chamber for accommodating the developer; and
- a stirring member having a shaft, and a sheet member held by the shaft, the sheet member stirring the developer accommodated in the developer accommodation chamber by rotation of the shaft, wherein,

- the developer accommodation chamber is set at a top in a gravity direction of the development chamber in a posture in which the developing apparatus is mounted in an image forming apparatus,
- the developer bearing member, the supply member, and the stirring member are rotatable around a rotation axis along a longitudinal direction of the developing apparatus as a center,
- a wall surface portion for partitioning the developer accommodation chamber and the development chamber is provided with an opening for enabling a movement of the developer from the developer accommodation chamber to the development chamber along the longitudinal direction, and
- in a cross section in the longitudinal direction, the opening has an end on an upstream side and an end on a downstream side in a direction of passage of the sheet member according to rotation of the stirring member, and a distance between a first end and a contact region of the developer bearing member and the supply member is shorter than a distance between a second end and the contact region where the first end represents the end on the upstream side at a central portion in the longitudinal direction, and the second end represents the end on the upstream side at the end in the longitudinal direction.

The present invention also provides an image forming apparatus configured to comprise:

- a developer bearing member for bearing a developer;
- a supply member for coming in contact with the developer bearing member, thereby forming a contact region, and supplying the developer to a surface of the developer bearing member in the contact region;
- a development chamber including the developer bearing member and the supply member arranged therein;
- a developer accommodation chamber for accommodating the developer;
- a stirring member having a shaft, and a sheet member held by the shaft, the sheet member stirring the developer accommodated in the developer accommodation chamber by rotation of the shaft; and
- an image bearing member for developing an electrostatic latent image formed on a surface when the developer is supplied from the developer bearing member, wherein,

- the developer accommodation chamber is set at a top in a gravity direction of the development chamber,
- the developer bearing member, the supply member, and the stirring member are each rotatable around a rotation axis along a longitudinal direction as a center,
- a wall surface portion for partitioning the developer accommodation chamber and the development chamber is provided with an opening for enabling a movement of the developer from the developer accommodation chamber to the development chamber along the longitudinal direction, and
- in a cross section in the longitudinal direction, the opening has an end on an upstream side and an end on a downstream side in a direction of passage of the sheet member according to rotation of the stirring member, and a distance between a first end and a contact region of the developer bearing member and the supply member is shorter than a distance between a second end and the contact region where the first end represents the end on the upstream side at a central portion in the longitudinal direction, and the second end represents the end on the upstream side at the end in the longitudinal direction.

The present invention also provides a developing apparatus configured to comprise:

a developer bearing member for bearing a developer;

a supply member for coming in contact with the developer bearing member, thereby forming a contact region, and supplying the developer to a surface of the developer bearing member in the contact region;

a development chamber including the developer bearing member and the supply member arranged therein;

a developer accommodation chamber for accommodating the developer; and a stirring member having a shaft, and a sheet member held by the shaft, the sheet member stirring the developer accommodated in the developer accommodation chamber by rotation of the shaft, wherein, the developer accommodation chamber is set at a top in a gravity direction of the development chamber in a posture in which the developing apparatus is mounted in an image forming apparatus, the developer bearing member, the supply member, and the stirring member are each rotatable around a rotation axis along a longitudinal direction of the developing apparatus as a center, a wall surface portion for partitioning the developer accommodation chamber and the development chamber is provided with an opening for enabling a movement of the developer from the developer accommodation chamber to the development chamber along the longitudinal direction, and in a cross section in the longitudinal direction, the opening has an end on an upstream side and an end on a downstream side in a direction of passage of the sheet member according to rotation of the stirring member, and a width between the end on the upstream side and the end on the downstream side at a central portion in the longitudinal direction is narrower than a width between the end on the upstream side and the end on the downstream side at the ends in the longitudinal direction.

In accordance with a configuration of the present invention, it is possible to circulate the developer in a development unit properly.

Further features of the present invention will become apparent from the following description of exemplary embodiments with reference to the attached drawings.

DESCRIPTION OF THE EMBODIMENTS

Below, referring to the accompanying drawings, preferred embodiments of the present invention will be described exemplarily in details. However, the dimensions, the materials, and the shapes of the constituent components described in the following embodiments, the relative arrangement thereof, and the like should be appropriately changed according to the configuration of the apparatus to which the present invention is applied, and various conditions. Therefore, it is not intended that the scope of the present invention is limited only thereto unless otherwise specified.

EXAMPLE 1

Whole Outline of Printer

EXAMPLE 1

Whole Outline of Printer

Figure 2:
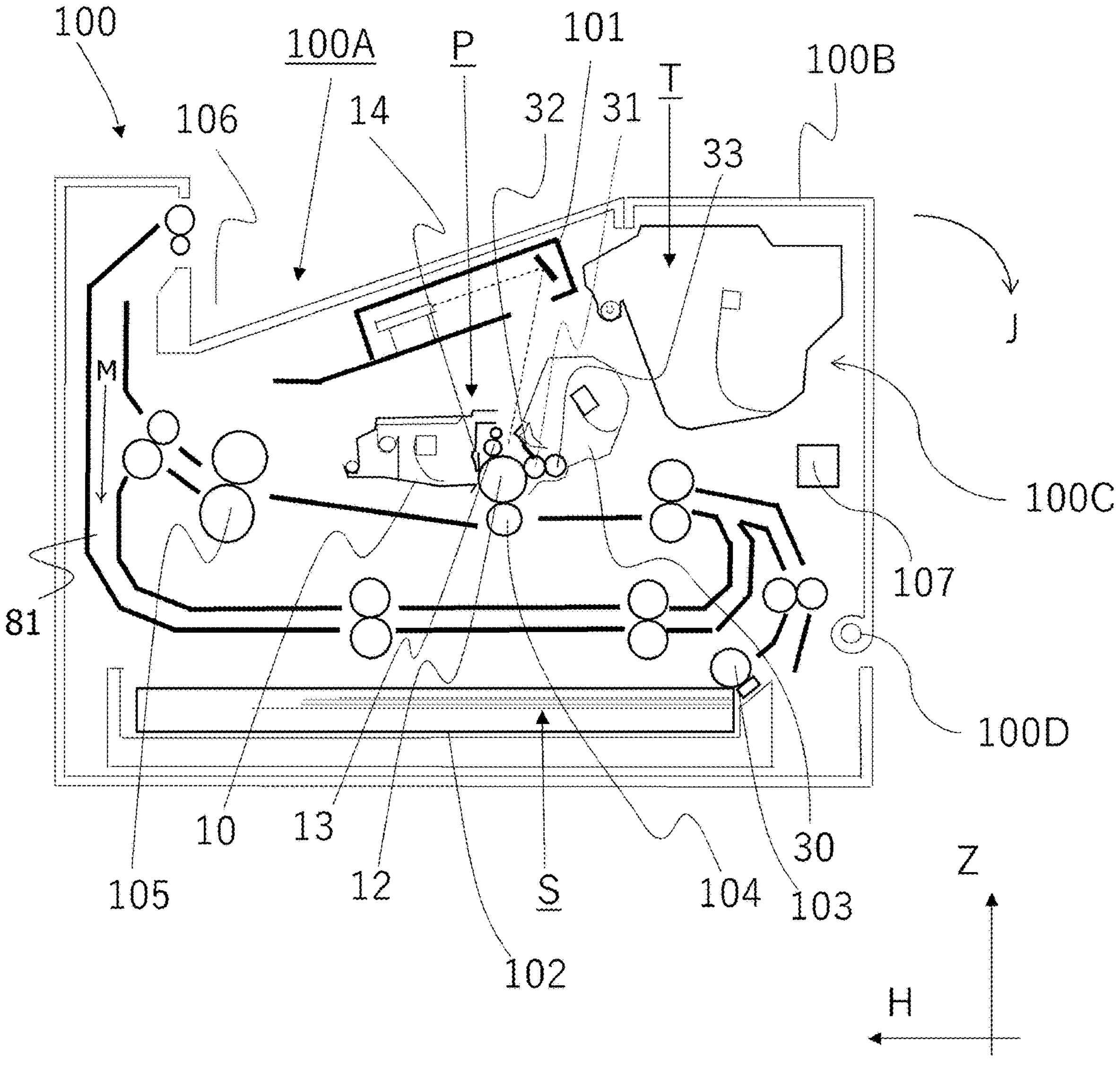
FIG. 2 is a schematic cross sectional view showing a configuration of a printer.

The basic configuration and the operation of a printer 100 as an image forming apparatus in accordance with the present example will be described by reference to FIG. 2. FIG. 2 is a schematic cross sectional view showing the configuration of the printer 100 in accordance with the present example. An arrow Z indicates the vertical direction, and an arrow H indicates a horizontal direction. As shown in FIG. 2, the printer 100 has an apparatus main body 100A, and a process cartridge P and a toner cartridge T removably mounted in the apparatus main body 100A as cartridges.

The apparatus main body 100A has a scanner 101 as an exposure device, a loading tray 102 for loading sheets S thereon, a paper feed roller 103, a transfer roller 104, a fixing portion 105, a discharge tray 106, and a control portion 107. Further, the process cartridge P and the toner cartridge T (developer cartridges) are removably mounted in the apparatus main body 100A.

The process cartridge P has a photosensitive drum 12, a charging roller 13 (charging member), a cleaning blade 14 (cleaning member), a drum unit 10, and a development unit 30 (developing apparatus) having a development roller 32, a supply roller 33, and a development frame body 31. A further configuration of the process cartridge P will be described later. The drum unit 10 has a drum frame body 11 described later. The photosensitive drum 12 is rotatably supported by the drum frame body 11. The development roller 32 is rotatably supported by the development frame body 31. Incidentally, a configuration in which the drum cartridge corresponding to the drum unit 10, and the development cartridge corresponding to the development unit 30 are respectively detachably set with respect to the image forming apparatus main body is also acceptable in place of such a configuration that the process cartridge P includes the drum unit 10 and the development unit 30.

The toner cartridge T can be mounted with respect to the process cartridge P. The toner cartridge T is configured so as to accommodate a toner as a developer, and to supply the toner to the development unit 30 of the process cartridge P. Although description will be made by reference to the accompanying drawings later, the toner cartridge T has a toner transport member 62, a toner transport screw 63, and a toner frame body 55. The toner transport member 62 and the toner transport screw 63 are rotatably supported by the toner frame body 55.

Figure 23:
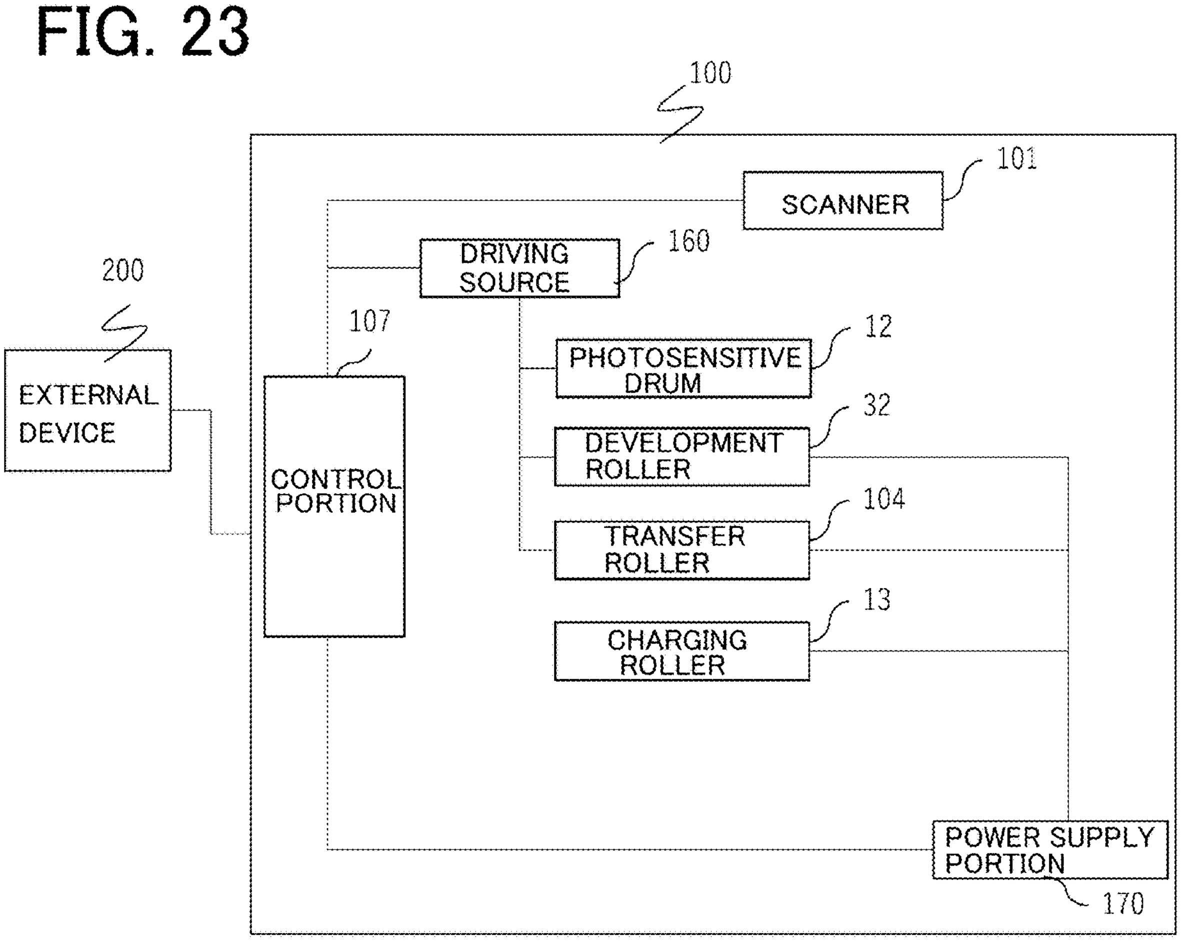
FIG. 23 is a block view showing a control configuration of an image forming apparatus.

The image formation operation onto a sheet S will be described. The control portion 107 of the printer 100 starts the image formation operation onto the sheet S on the basis of a signal received from an external device 200 shown in FIG. 23. The control portion 107 includes an information processing device having arithmetic resources such as a processor and a memory, a processing circuit, and the like. As shown in a block view of FIG. 23, the control portion 107 acquires information from each constituent element of the printer 100 according to the program stored in a memory, or a user instruction using the external device 200, and performs control by a control signal. The printer 100 includes a driving source 160 having a motor, or the like, and a power supply portion 170 for supplying an electric power such as a driving voltage to each constituent element.

First, the photosensitive drum 12 is rotated by the driving source 160 of the apparatus main body 100A. The charging roller 13 is rotated following the photosensitive drum 12 with the charging roller 13 applied with a charging voltage by the power supply portion 170. As a result, the surface of the photosensitive drum 12 is uniformly charged. On the basis of image information, the scanner 101 applies a laser toward the charged surface of the photosensitive drum 12, so that an electrostatic latent image is formed on the surface of the photosensitive drum 12.

When the development roller 32 is applied with a development voltage by the power supply portion 170, a toner is supplied to the photosensitive drum 12 from the development roller 32. As a result, an electrostatic latent image is developed as a toner image. Subsequently, the rotation of the photosensitive drum 12 transports the toner image formed at the photosensitive drum 12 toward the transfer portion formed between the transfer roller 104 and the photosensitive drum 12.

On the other hand, a sheet S is fed from the loading tray 102 by the paper feed roller 103. The sheet S is transported to the transfer portion in accordance with the timing at which the toner image formed at the photosensitive drum 12 reaches the transfer portion.

A transfer voltage is applied to the transfer roller 104 from the power supply portion 170, so that the toner image is transferred from the photosensitive drum 12 to the sheet S. The residual toner not transferred to the sheet S is removed from the surface of the photosensitive drum 12 by a cleaning blade 14.

The sheet S onto which the toner image has been transferred is transported toward the fixing portion 105. When the sheet S passes through the fixing portion 105, the toner image is heated and pressurized by a fixing portion 105, thereby to be fixed onto the sheet S.

The printer 100 in accordance with the present example can carry out double-sided printing in which an image formation operation is performed on the front surface and the back surface of the sheet S. When an image is formed on only the front surface of the sheet S, the sheet S that has passed through the fixing portion 105 is discharged to the discharge tray 106. On the other hand, when double-side printing is carried out, the sheet S with the toner image fixed on the surface thereof is transported in an arrow M direction through a double-side transport path 81, and reaches the transfer portion again. As a result, a toner image is formed on the back surface of the sheet S. Subsequently, the sheet S passes through the fixing portion 105, and is discharged to the discharge tray 106.

Attachment and Removal of Process Cartridge and Toner Cartridge

Referring to FIGS. 2, 3, 4, 5, 6, and 10, a description will be given to attachment and removal of a process cartridge P and a toner cartridge T in accordance with the present example with respect to the apparatus main body 100A.

Figure 3:
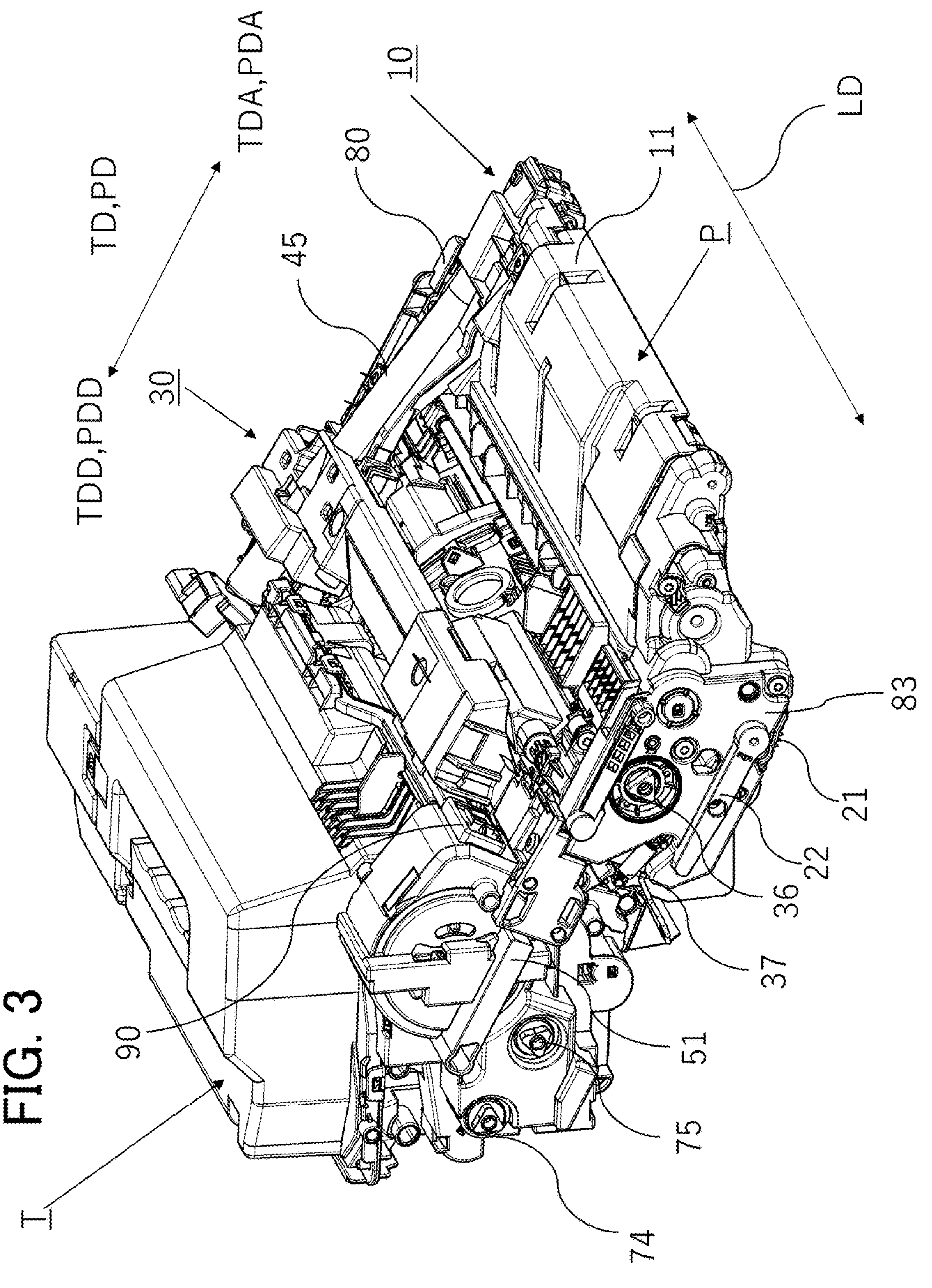
FIG. 3 is a perspective view of a process cartridge and a toner cartridge.
Figure 4:
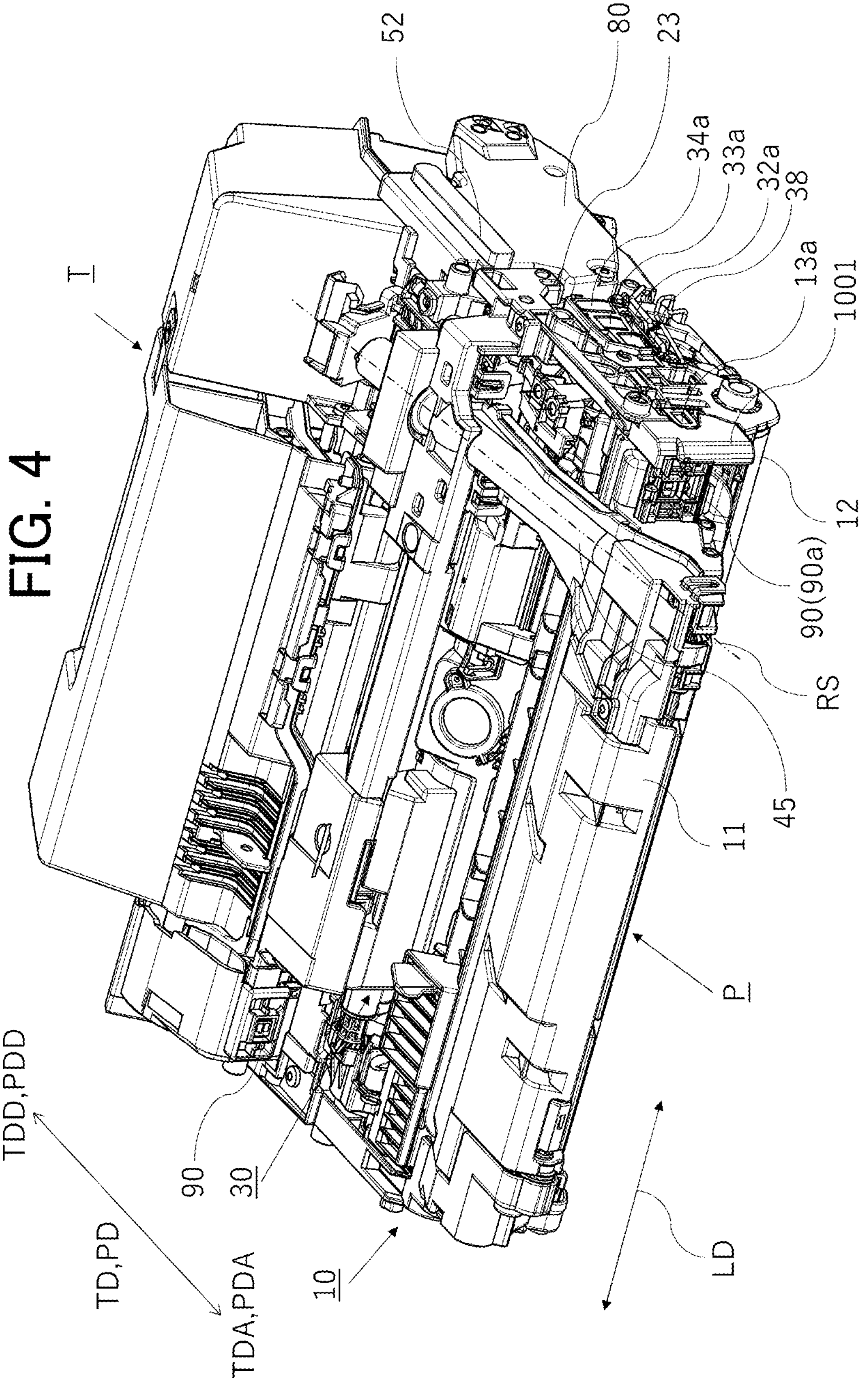
FIG. 4 is a perspective view of a process cartridge and a toner cartridge.
Figure 5:
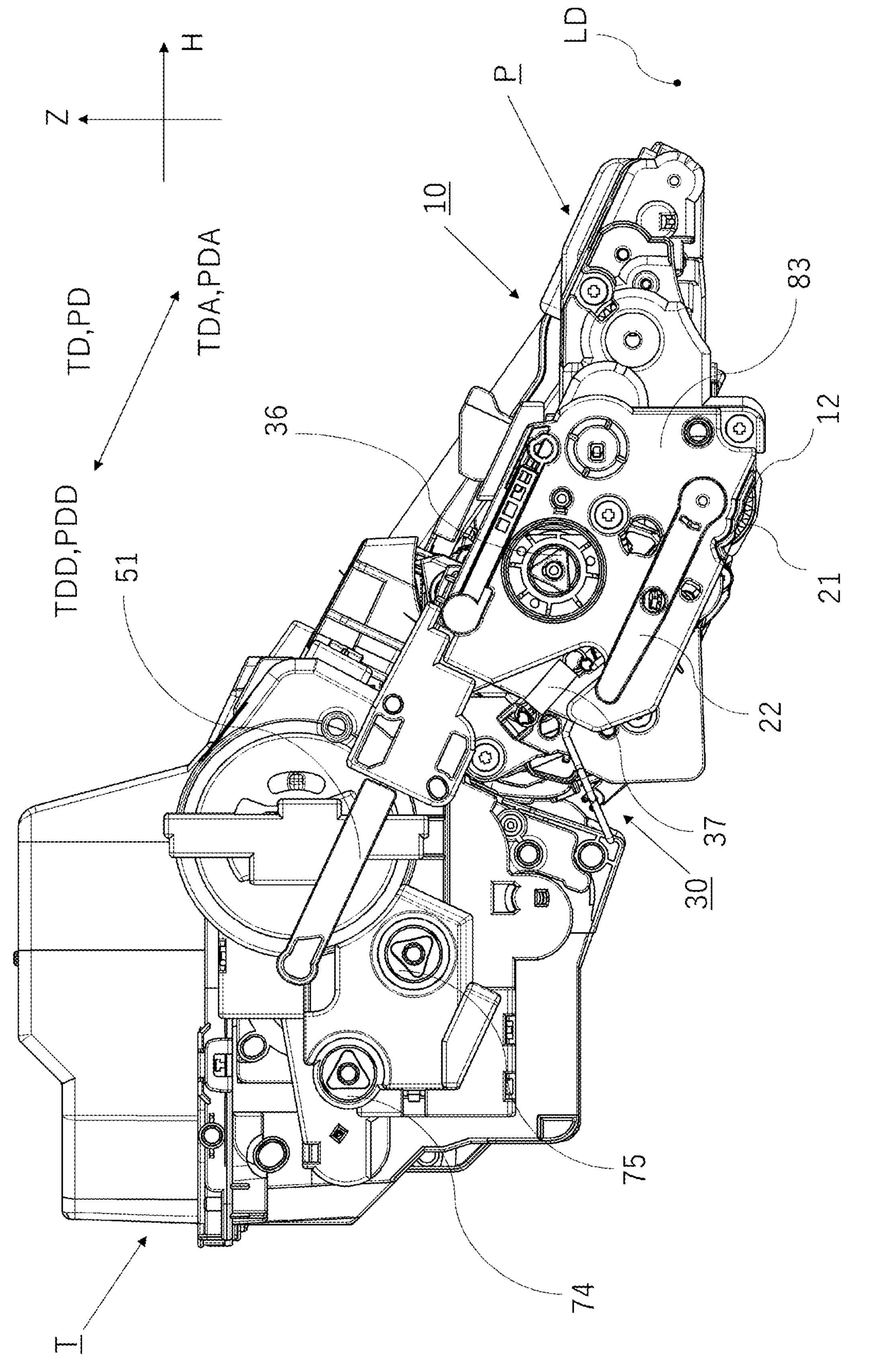
FIG. 5 is a side view of a process cartridge and a toner cartridge.
Figure 6:
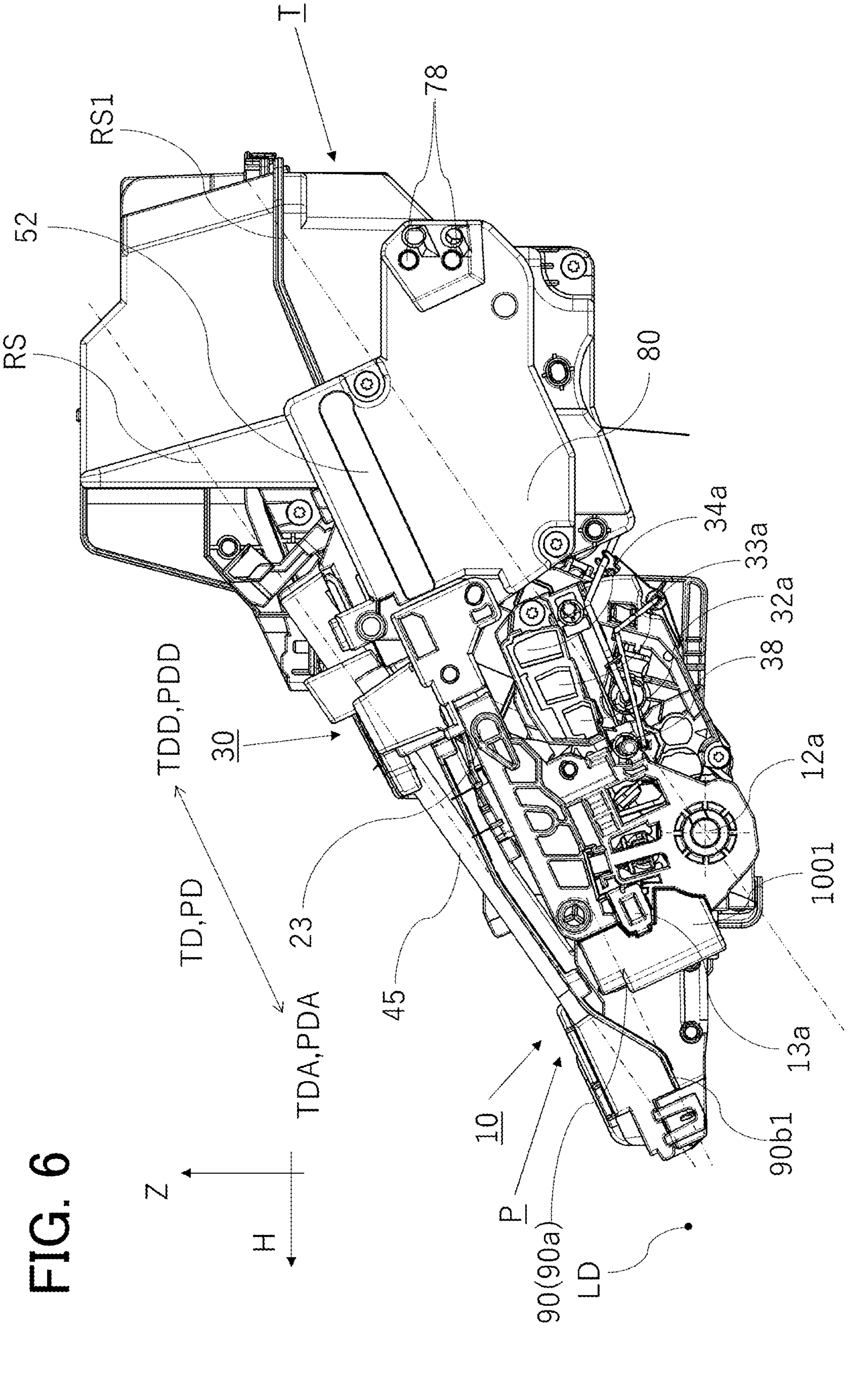
FIG. 6 is a side view of a process cartridge and a toner cartridge.

FIGS. 3 and 4 are each a perspective view of the process cartridge P and the toner cartridge T. FIGS. 5 and 6 are each a side view of the process cartridge P and the toner cartridge T. The photosensitive drum 12 is rotatable around the rotation axis (first axis) 12*a* shown in FIG. 6. The direction of extension of the rotation axis 12*a* is referred to as the rotation axis direction (axis direction) of the photosensitive drum 12.

FIG. 3 is a perspective view of the process cartridge P and the toner cartridge T as seen from the driving side. FIG. 4 is a perspective view of the process cartridge P and the toner cartridge T as seen from a non-driving side. FIG. 5 is a side view of the driving side of the process cartridge P and the toner cartridge T as seen in the rotation axis direction of the photosensitive drum 12. FIG. 6 is a side view of the non-driving side of the process cartridge P and the toner cartridge T as seen in the rotation axis direction of the photosensitive drum 12.

As shown in FIG. 2, the printer 100 has a door (opening/closing member) 100B that covers an opening 100C of the apparatus main body 100A. The door 100B is attached rotatably around the rotation axis 100D with respect to the apparatus main body 100A. The door 100B is configured movably in an arrow J direction from the closing position covering the opening 100C to the opening position exposing the opening 100C. With the door 100B present at the opening position, the attachment of the process cartridge P and the toner cartridge T to the apparatus main body 100A, and the removal of the process cartridge P and the toner cartridge T from the apparatus main body 100A though the opening 100C are allowed.

Figure 10:
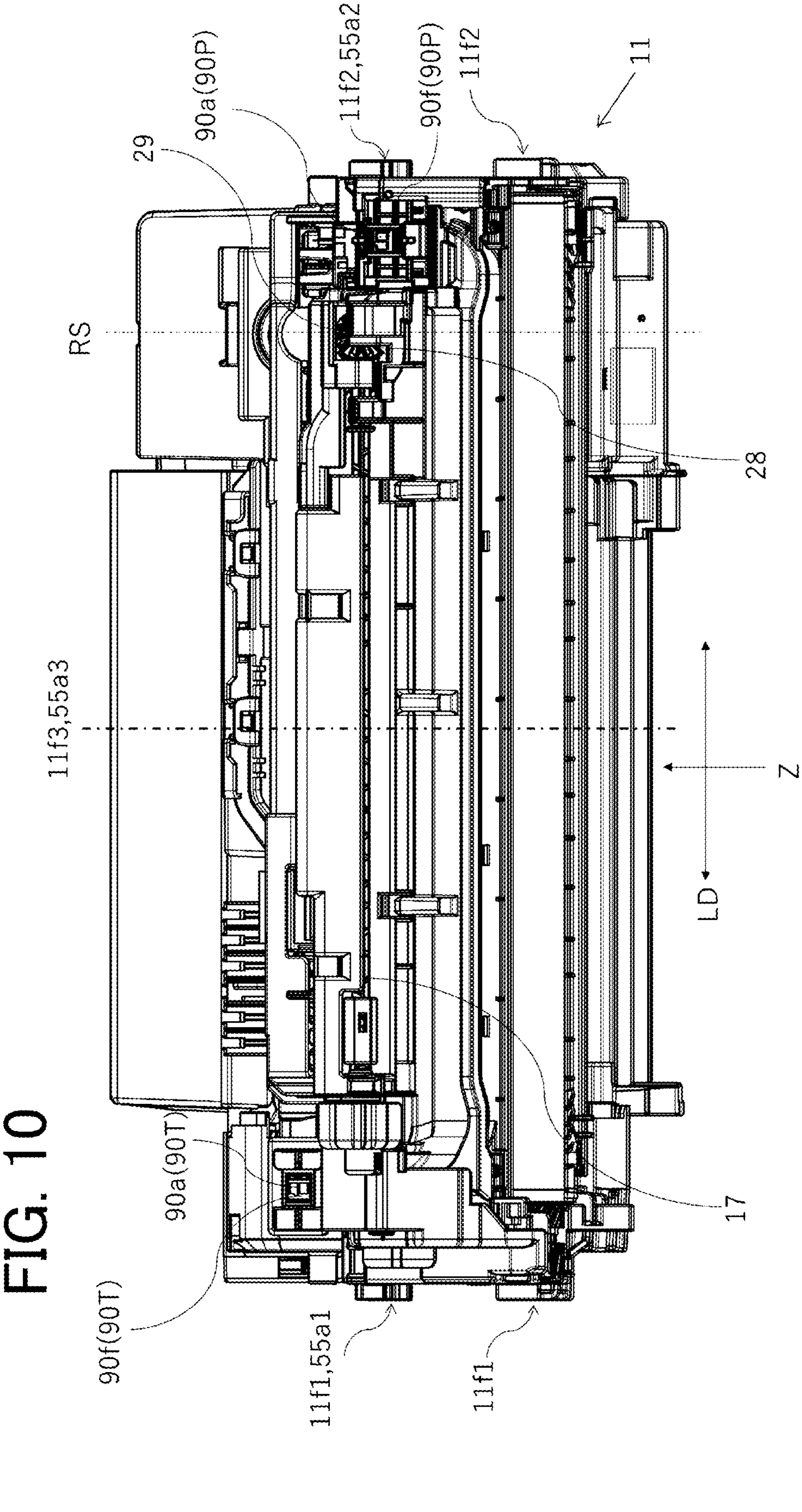
FIG. 10 is a view of a process cartridge and a toner cartridge as seen in the removing direction.

FIG. 10 is a view of the process cartridge P and the toner cartridge T as seen in the removal direction PDD. As shown in FIG. 10, with regard to the direction of the rotation axis 12*a* of the photosensitive drum 12, the drum frame body 11 has a process driving end (the first end of the drum frame body 11) 11*f*1, and a process non-driving end (the second end of the drum frame body 11) 11*f*2 opposite to the process driving end 11*f*1. The process driving end 11*f*1 and the process non-driving end 11*f*2 are the portions (ends) situated at the outermost positions in the drum frame body 11 in the rotation axis direction of the photosensitive drum 12. A plurality of the process driving ends 11*f*1 and a plurality of the process non-driving ends 11*f*2 may be present. The center of the drum frame body 11 in the rotation axis direction of the photosensitive drum 12 is referred to as a center 11*f*3. The distance between the center 11*f*3 and the process driving end 11*f*1 of the drum frame body 11 and the distance between the center 11*f*3 and the process non-driving end 11*f*2 thereof are equal to each other.

In the present Example, the process driving end 11*f*1 and the process non-driving end 11*f*2 are portions (ends) situated at the outermost positions of the process cartridge P in the rotation axis direction of the photosensitive drum 12. In other words, in the rotation axis direction of the photosensitive drum 12, the process driving end 11*f*1 and the process non-driving end 11*f*2 are in agreement with the driving end (the first end of the process cartridge P) and the non-driving end (the second end of the process cartridge P) of the process cartridge P. In the rotation axis direction of the photosensitive drum 12, the "driving side" of the drum frame body 11 or the process cartridge P is situated opposite to the "non-driving side" of the drum frame body 11 or the process cartridge P.

In the rotation axis direction of the photosensitive drum 12, the side on which the process driving end 11*f*1 is arranged with respect to the center 11*f*3 of the drum frame body 11 is the driving side of the drum frame body 11 or the driving side of the process cartridge P. In the rotation axis direction of the photosensitive drum 12, the side on which the process non-driving end 11*f*2 is arranged with respect to the center 11*f*3 of the drum frame body 11 is the non-driving side of the drum frame body 11 or the non-driving side of the process cartridge P. In the present Example, in the rotation axis direction of the photosensitive drum 12, the center 11*f*3 of the drum frame body 11 is the same as the center of the process cartridge P.

Figure 14:
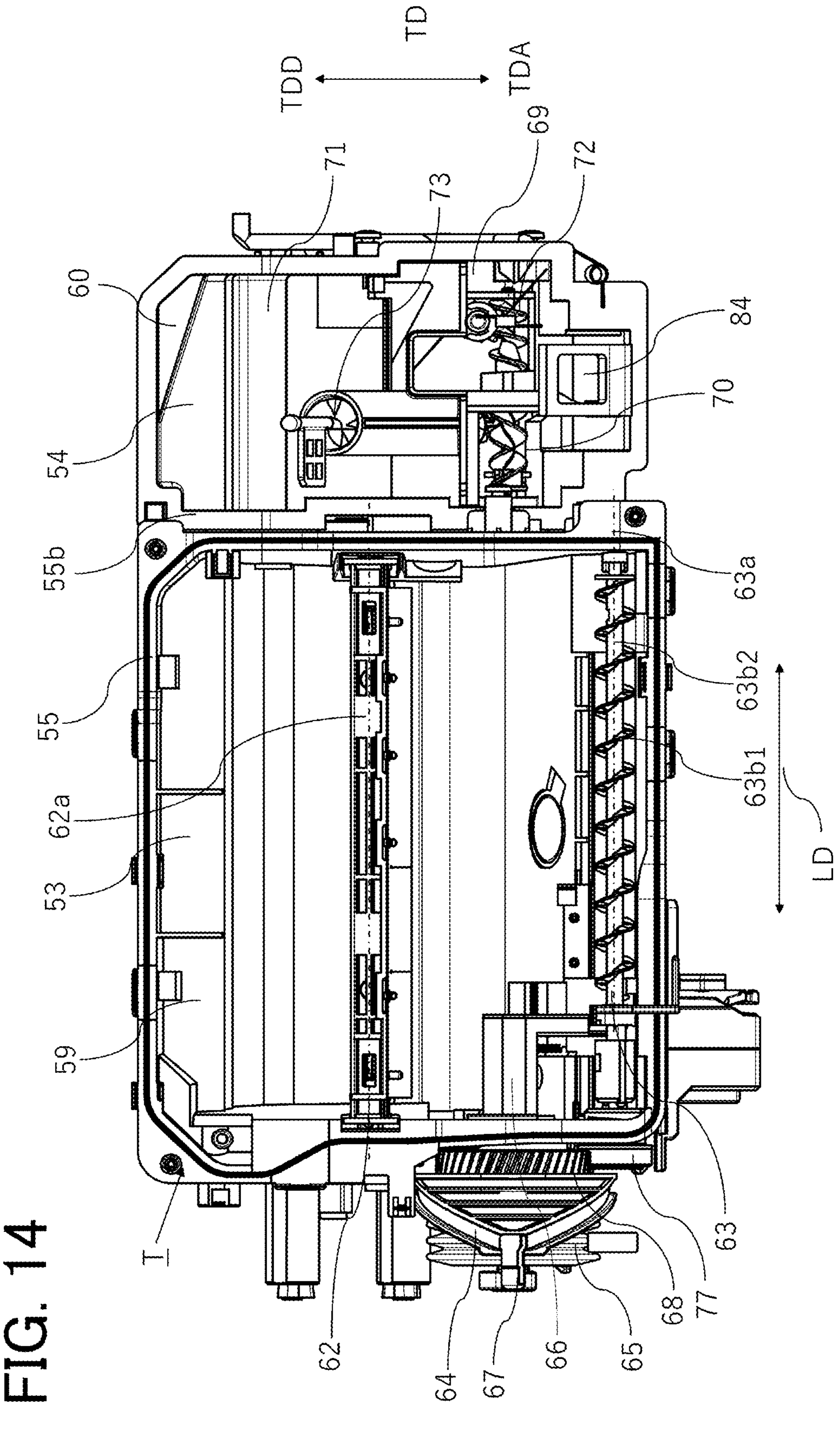
FIG. 14 is a view showing an inside structure of a toner cartridge.

Although described later, the toner transport member 62 shown in FIG. 14 is rotatable around the rotation axis 62*a*. The direction of extension of the rotation axis 62*a* is referred to as the rotation axis direction (axis direction) of the toner transport member 62. Further, the toner transport screw 63 shown in FIG. 14 is rotatable around the rotation axis 63*a*. The direction of extension of the rotation axis 63*a* is referred to as the rotation axis direction (axis direction) of the toner transport screw 63.

As shown in FIG. 10, with regard to the rotation axis direction LD of the toner transport screw 63, the toner frame body 55 has a toner driving end (the first end of the toner frame body 55) 55*a*1, and a toner non-driving end 55*a*2 (the second end of the toner frame body 55) opposite to the toner driving end 55*a*1. The toner driving end 55*a*1 and the toner non-driving end 55*a*2 are portions (ends) situated at the outermost positions in the toner frame body 55 in the rotation axis direction of the toner transport screw 63. A plurality of the toner driving ends 55*a*1 and a plurality of the toner non-driving ends 55*a*2 may be present. In the rotation axis direction of the toner transport screw 63, the center of the toner frame body 55 is referred to as a center 55*a*3. The distance between the center 55*a*3 and the toner driving end 55*a*1 of the toner frame body 55 and the distance between the center 11*f*3 and the toner non-driving end 55*a*2 thereof are equal to each other.

In the present Example, the toner driving end 55*a*1 and the toner non-driving end 55*a*2 are portions (ends) situated at the outermost position in the toner cartridge T in the rotation axis direction of the toner transport screw 63. In other words, in the rotation axis direction of the toner transport screw 63, the toner driving end 55*a*1 and the toner non-driving end 55*a*2 are in agreement with the driving end (the first end of the toner cartridge T) and the non-driving end (the second end of the toner cartridge T) of the toner cartridge T.

In the rotation axis direction of the toner transport screw 63, the side on which the toner driving end 55*a*1 is arranged with respect to the center 55*a*3 of the toner frame body 55 is the driving side of the toner frame body 55, or the driving side of the toner cartridge T. In the rotation axis direction of the toner transport screw 63, the side on which the toner non-driving end 55*a*2 is arranged with respect to the center 55*a*3 of the toner frame body 55 is the non-driving side of the toner frame body 55, or the non-driving side of the toner cartridge T. In the present Example, in the rotation axis direction of the toner transport screw 63, the center 55*a*3 of the toner frame body 55 is the same as that of the toner cartridge T.

In the rotation axis direction of the toner transport screw 63, the driving side of the toner frame body 55 or the driving side of the toner cartridge T is situated opposite to the non-driving side of the toner frame body 55 or the non-driving side of the toner cartridge T.

In the present example, the rotation axis direction of the photosensitive drum 12, the rotation axis direction of the toner transport member 62, and the rotation axis direction of the toner transport screw 63 are in parallel to one another. Therefore, the rotation axis direction of the photosensitive drum 12, the rotation axis direction of the toner transport member 62, and the rotation axis direction of the toner transport screw 63 are each also referred to simply as the axis direction (the first direction) LD.

In the present Example, in the axis direction LD, the position of the center 55*a*3 of the toner frame body 55 and the position of the center 11*f*3 of the drum frame body 11 are the same. However, the position of the center 55*a*3 of the toner frame body 55 and the position of the center 11*f*3 of the drum frame body 11 may be different from each other.

As shown in FIGS. 3 and 5, the process cartridge P has a driving side process guide 22 on the driving side of the drum frame body 11. The toner cartridge T has a driving side toner guide 51 on the driving side of the toner frame body 55. As shown in FIGS. 4 and 6, the process cartridge P has a non-driving side process guide 23 on the non-driving side of the drum frame body 11. The toner cartridge T has a non-driving side toner guide 52 on the non-driving side of the toner frame body 55.

The direction in which the process cartridge P is attached with respect to the apparatus main body 100A is referred to as the attachment direction PDA. The direction in which the process cartridge P is removed from the apparatus main body 100A is referred to as the removal direction PDD. The attachment direction PDA and the removal direction PDD are collectively referred to as the removal/attachment direction PD of the process cartridge P. The driving side process guide 22 and the non-driving side process guide 23 are formed along the removal/attachment direction PD. The driving side process guide 22 and the non-driving side process guide 23 are guided by a guide portion of the apparatus main body 100A, and the process cartridge P moves in the removal/attachment direction PD with respect to the apparatus main body 100A.

The direction in which the toner cartridge T is attached to the apparatus main body 100A is referred to as an attachment direction TDA. The direction in which the toner cartridge T is removed from the apparatus main body 100A is referred to as a removal direction TDD. The attachment direction TDA and the removal direction TDD are collectively referred to as a removal/attachment direction TD of the toner cartridge T. The driving side toner guide 51 and the non-driving side toner guide 52 are formed along the removal/attachment direction TD. The driving side toner guide 51 and the non-driving side toner guide 52 are guided by the guide portion of the apparatus main body 100A, and the toner cartridge T moves in the removal/attachment direction TD with respect to the apparatus main body 100A.

In the present Example, the removal/attachment direction PD of the process cartridge P is the direction crossing the axis direction LD. The angle formed between the direction orthogonal to the axis direction LD and the removal/attachment direction PD is preferably smaller than the angle formed between the axis direction LD and the removal/attachment direction PD, and the removal/attachment direction PD is more preferably the direction orthogonal to the axis direction LD.

In the present example, the removal/attachment direction TD of the toner cartridge T is the direction crossing the axis direction LD. The angle formed between the direction orthogonal to the axis direction LD and the removal/attachment direction TD is preferably smaller than the angle formed between the axis direction LD and the removal/attachment direction TD, and the removal/attachment direction TD is more preferably the direction orthogonal to the axis direction LD.

Incidentally, in the present example, although the removal/attachment direction PD and the removal/attachment direction TD are in parallel with each other, the removal/attachment direction PD and the removal/attachment direction TD may be different from each other.

In the present example, the attachment and the removal of the process cartridge P are performed with the toner cartridge T not attached to the apparatus main body 100A. In other words, the attachment and the removal of the process cartridge P are performed before the attachment of the toner cartridge T with respect to the apparatus main body 100A.

With the toner cartridge T not attached with respect to the apparatus main body 100A, the process cartridge P is attached with respect to the apparatus main body 100A through the opening 100C. Further, with the process cartridge P attached with respect to the apparatus main body 100A, the toner cartridge T is attached with respect to the apparatus main body 100A and the process cartridge P through the opening 100C.

With the toner cartridge T and the process cartridge P attached with respect to the apparatus main body 100A, in the attachment direction PDA and the attachment direction TDA, the process cartridge P is situated on the downstream side of the toner cartridge T, and the toner cartridge T is situated on the upstream side of the process cartridge P.

When the toner cartridge T and the process cartridge P are removed from the apparatus main body 100A, the toner cartridge T is removed from the apparatus main body 100A and the process cartridge P through the opening 100C. Subsequently, the process cartridge P is removed from the apparatus main body 100A through the opening 100C.

Toner Cartridge

Referring to FIGS. 7, 8, and 11A and 11B to 17, a configuration of the toner cartridge T in accordance with the present example will be described in further details.

Figure 11A:
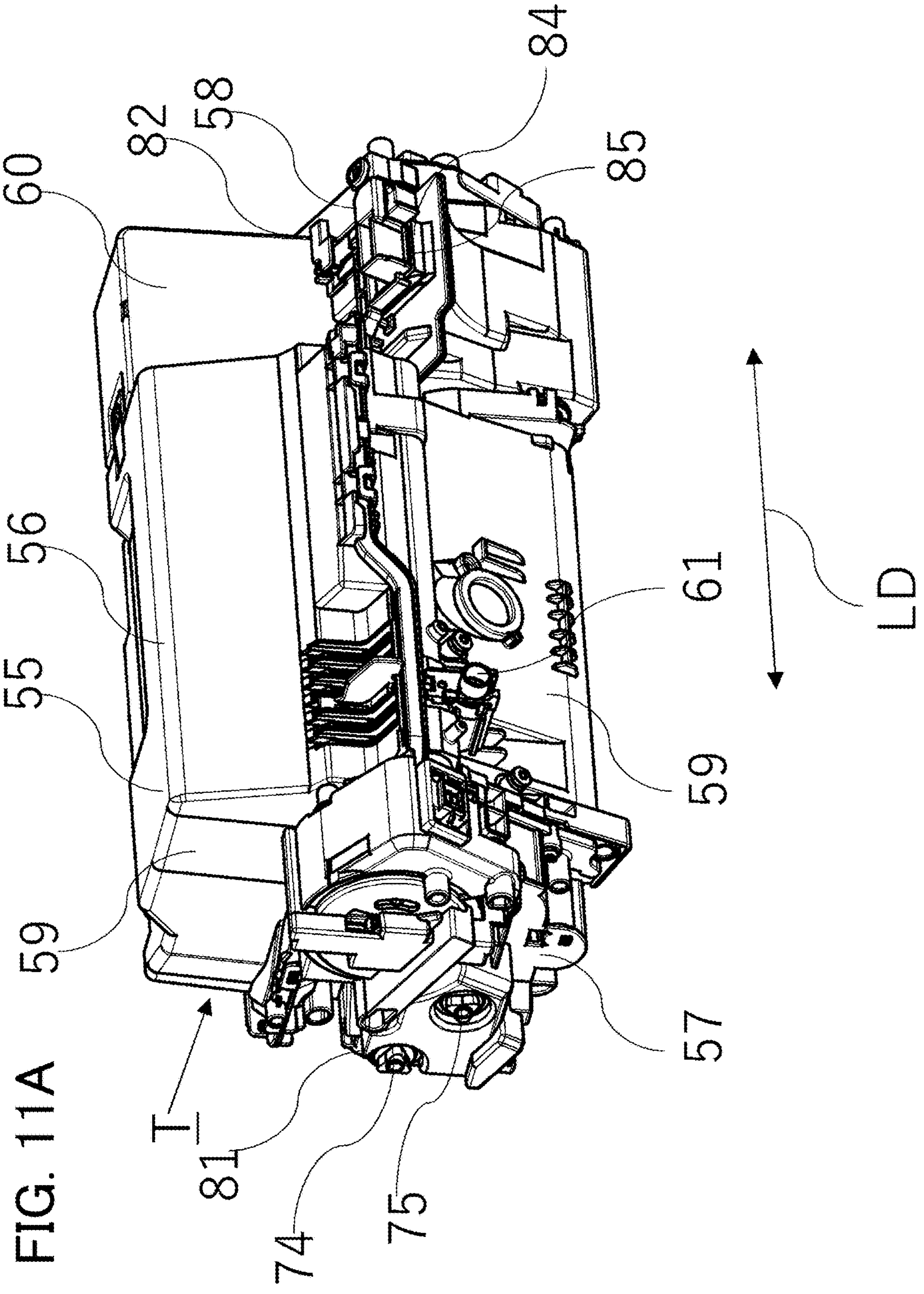
FIG. 11A is a perspective view of a toner cartridge.
Figure 11B:
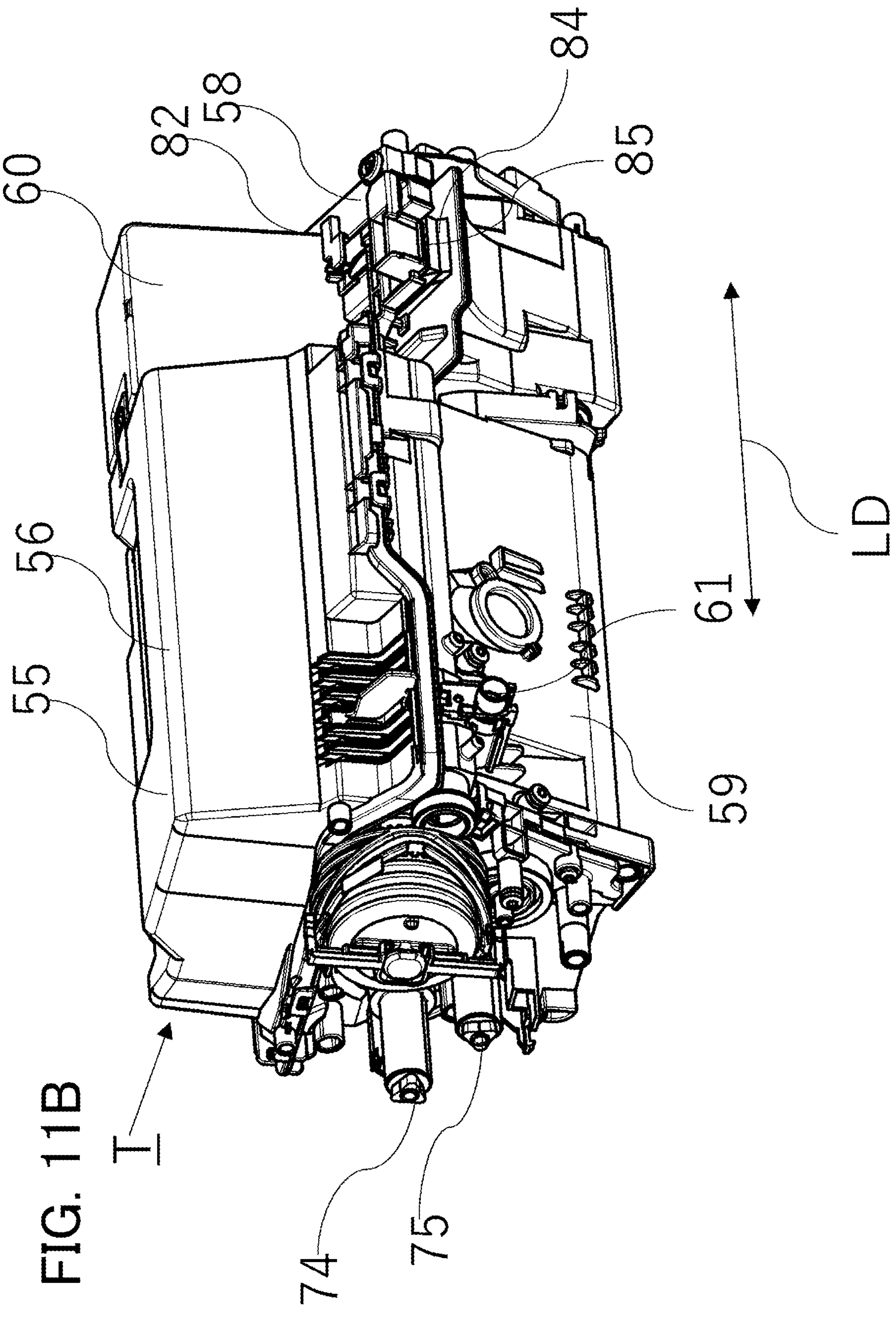
FIG. 11B is a perspective view of a toner cartridge.
Figure 12A:
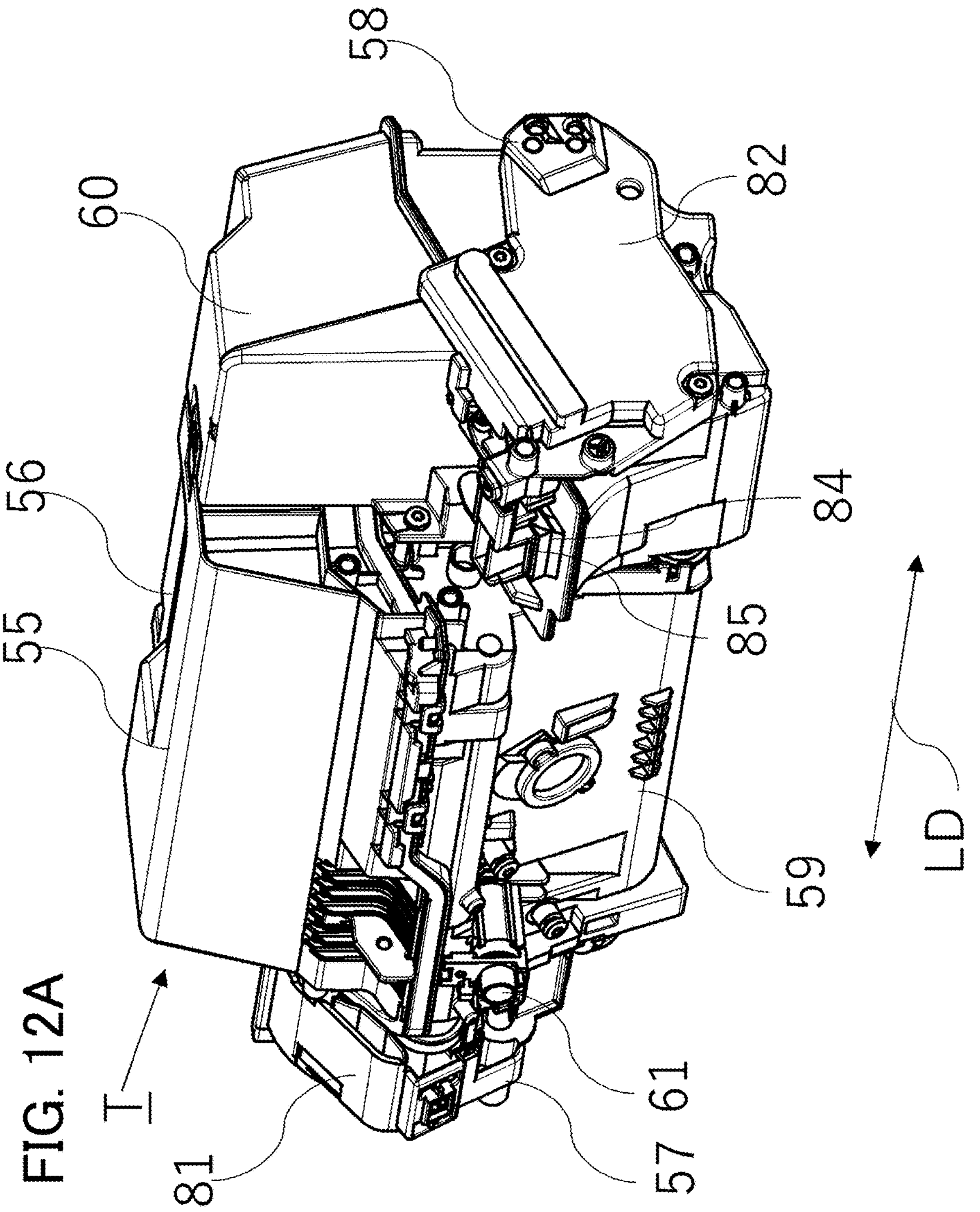
FIG. 12A is a perspective view of a toner cartridge.
Figure 12B:
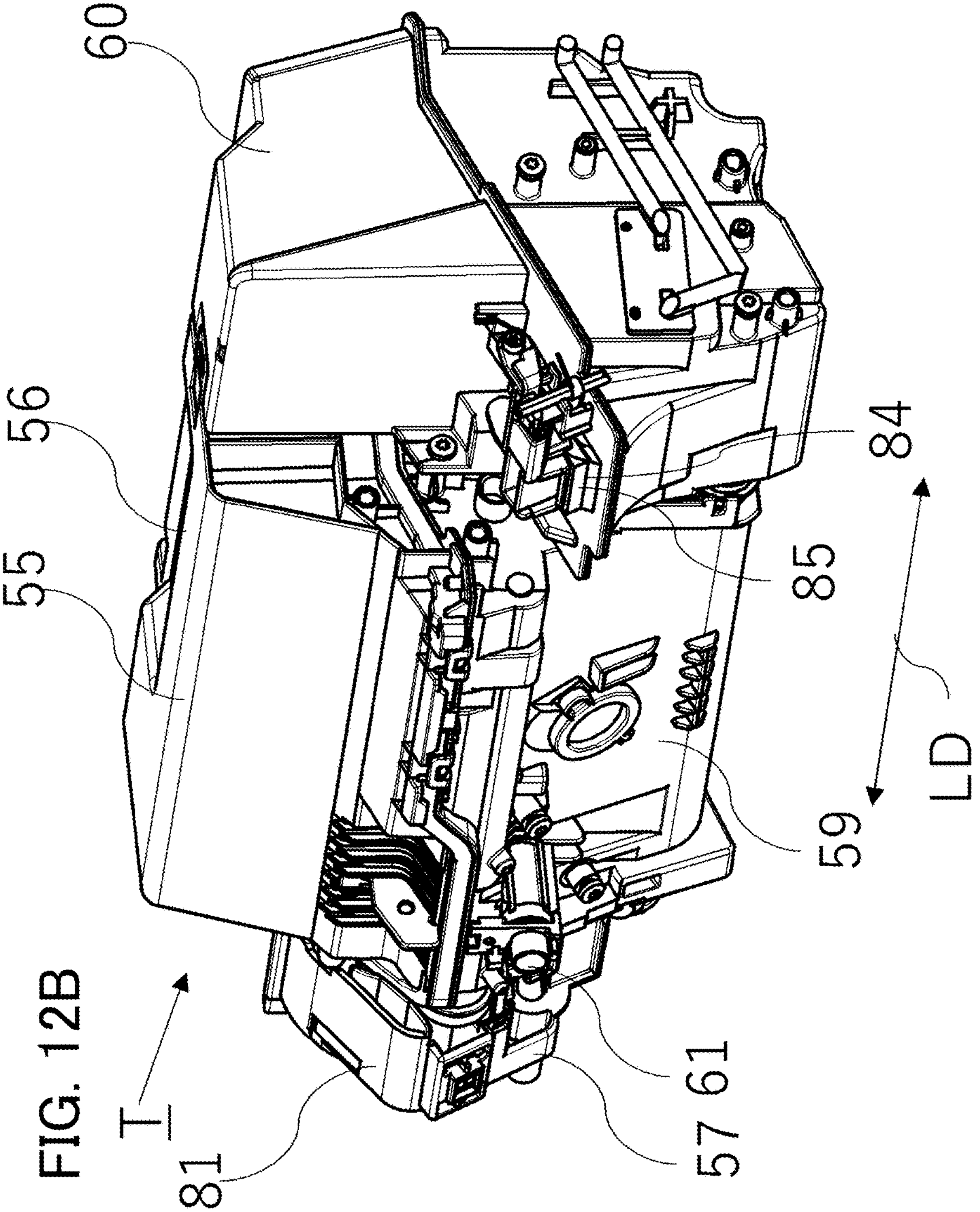
FIG. 12B is a perspective view of a toner cartridge.

FIGS. 11A, 11B, 12A, and 12B are each a perspective view of the toner cartridge T. Specifically, FIGS. 11A and 11B are each a perspective view of the toner cartridge T as seen from the driving side. In FIG. 11B, a part of the toner cartridge Tis omitted. FIGS. 12A and 12B are each a perspective view of the toner cartridge T as seen from the non-driving side. In FIG. 12B, a part of the toner cartridge T is omitted.

Figure 13:
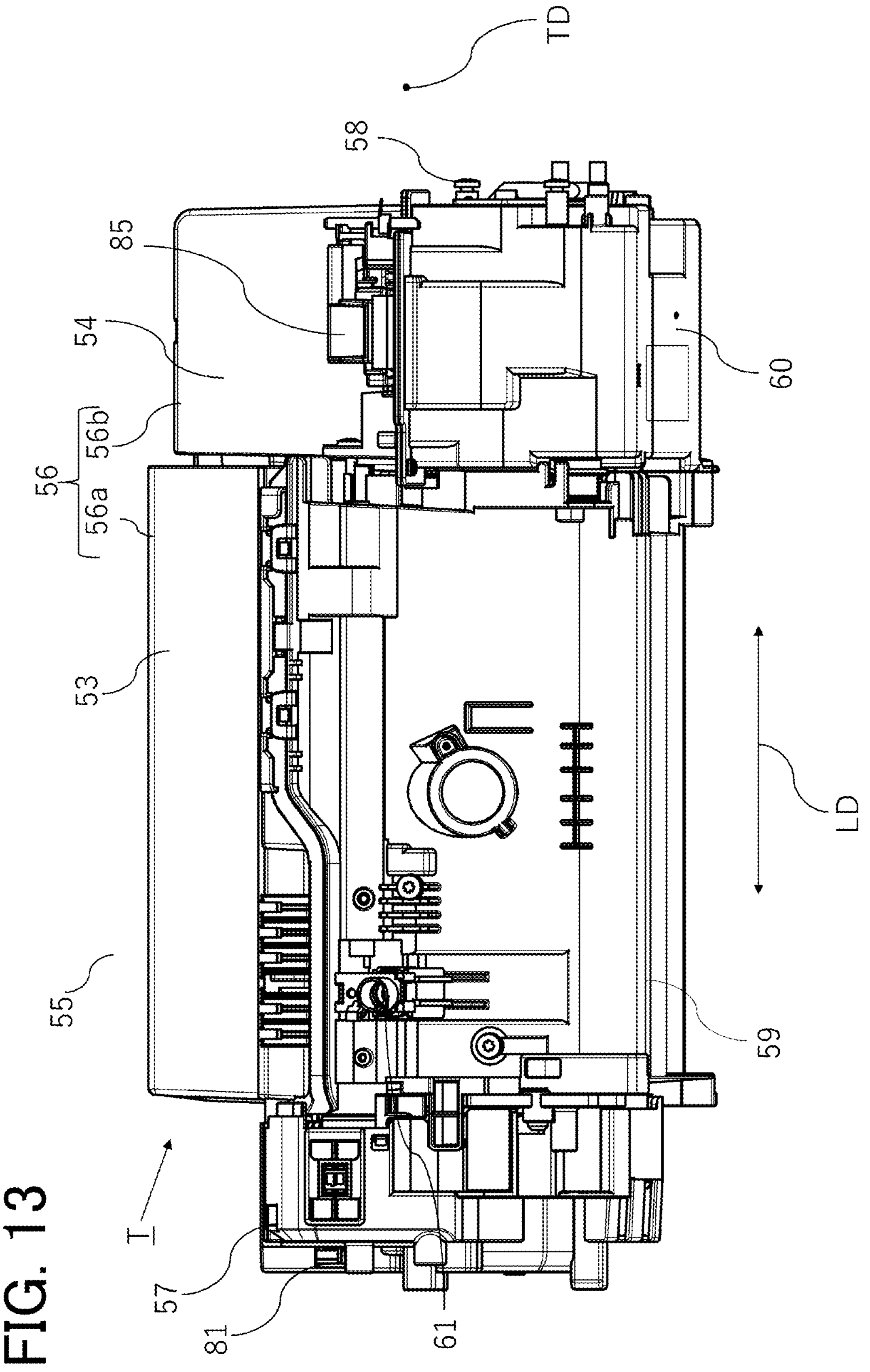
FIG. 13 is a view of a toner cartridge as seen in the removing direction.
Figure 15:
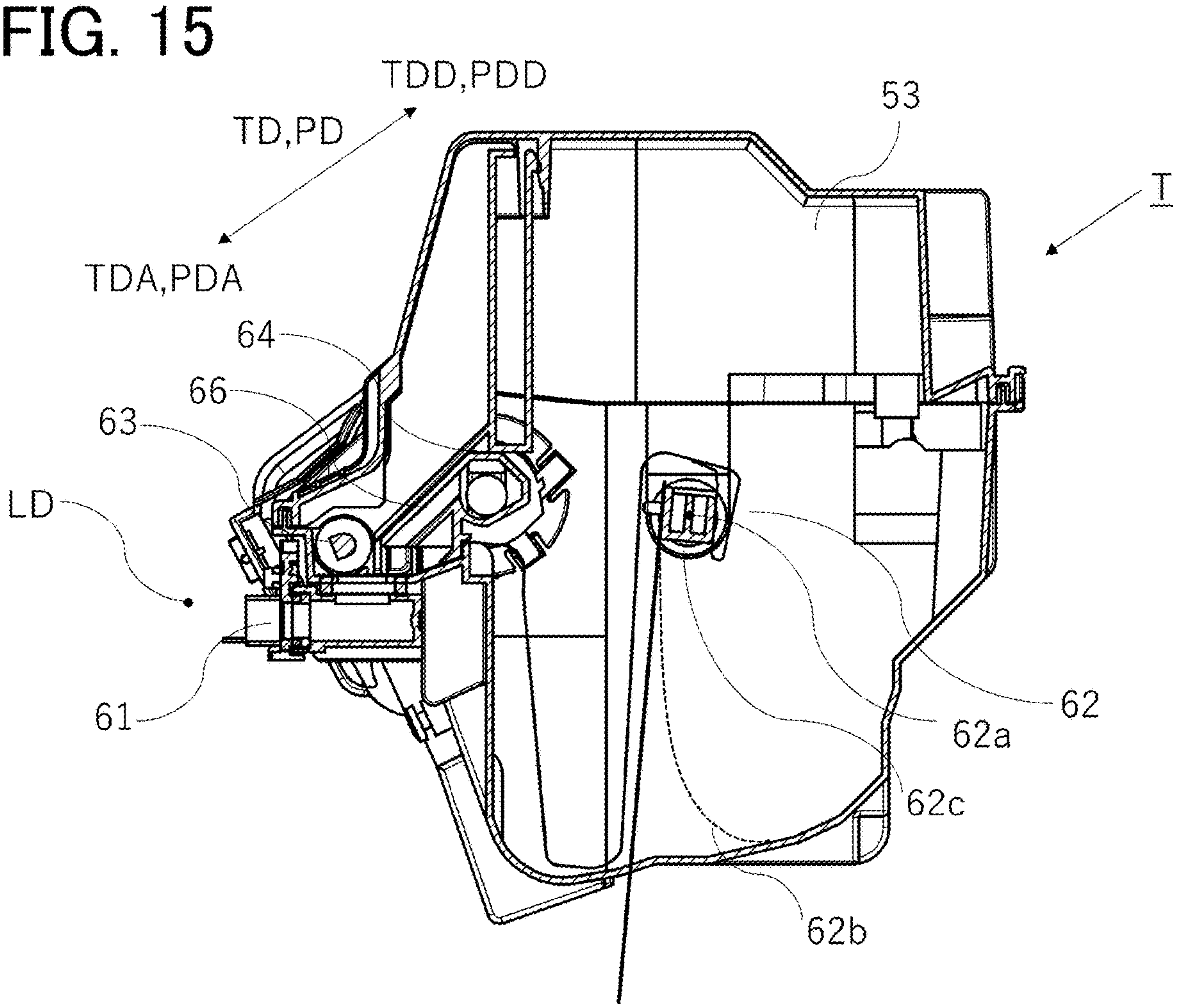
FIG. 15 is a cross sectional view of a toner cartridge.

FIG. 13 is a view of the toner cartridge T as seen in the removal direction TDD. FIG. 14 is a view showing an inside structure of the toner cartridge T. FIG. 15 is a cross sectional view of the toner cartridge T with the direction orthogonal to the axis direction LD as the cross sectional direction.

Figure 16A:
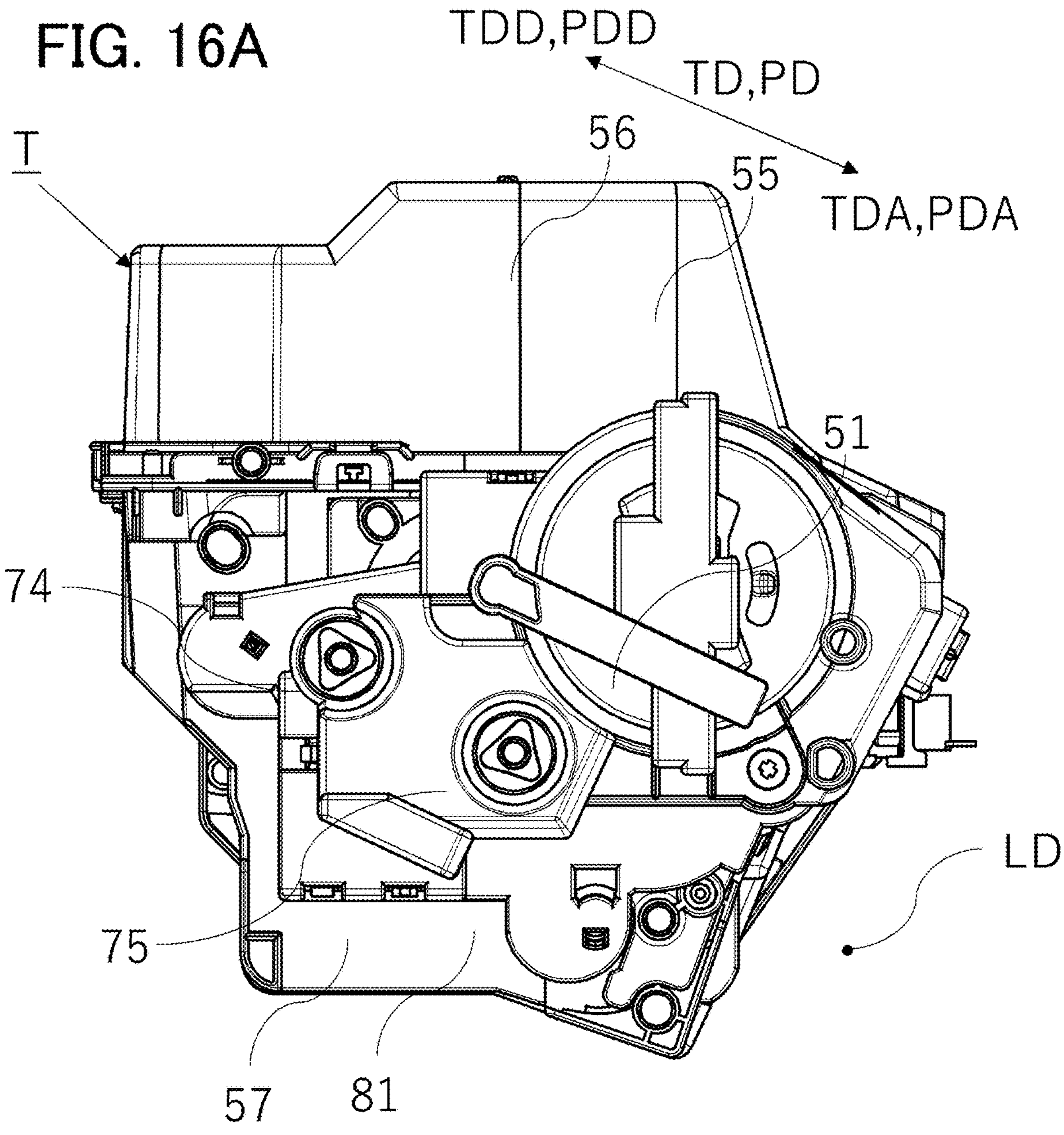
FIG. 16A is a side view of a toner cartridge.
Figure 16B:
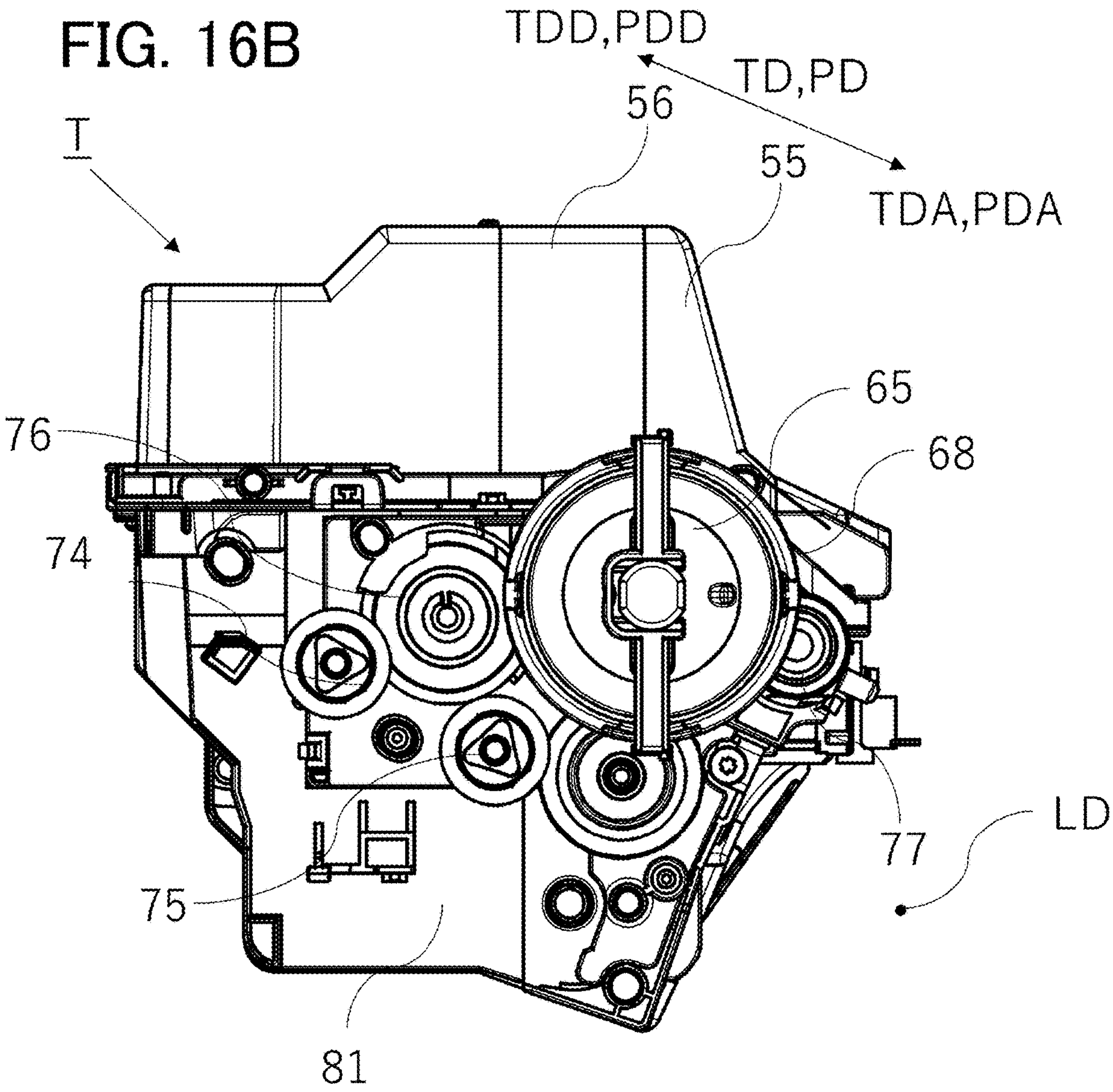
FIG. 16B is a side view of a toner cartridge.
Figure 17:
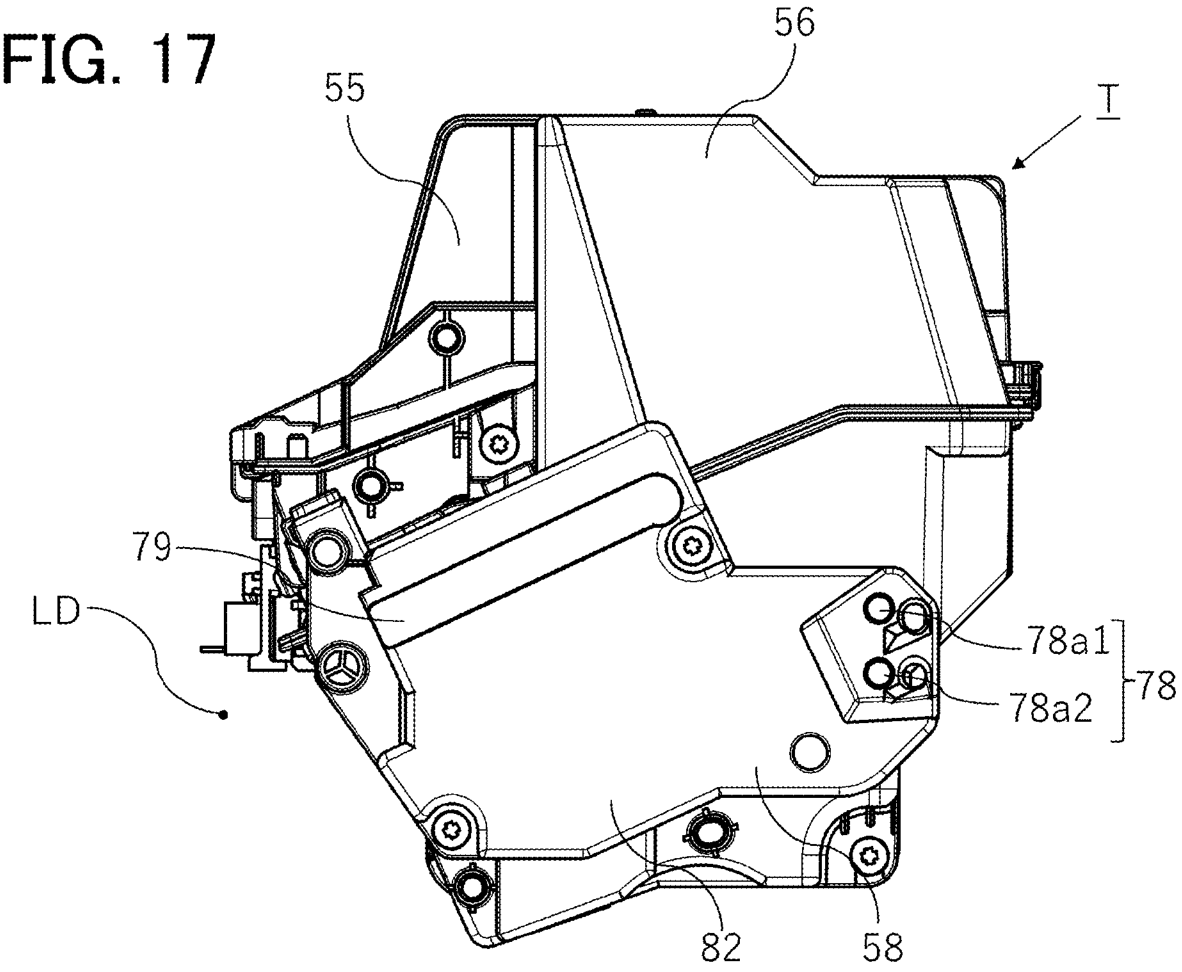
FIG. 17 is a side view of a toner cartridge.

FIGS. 16A, 16B, and 17 are each a side view of the toner cartridge T. Specifically, FIGS. 16A and 16B are each a side view of the driving side of the toner cartridge T as seen in the axis direction LD. FIG. 17 is a side view of the non-driving side of the toner cartridge T as seen in the axis direction LD.

Figure 7:
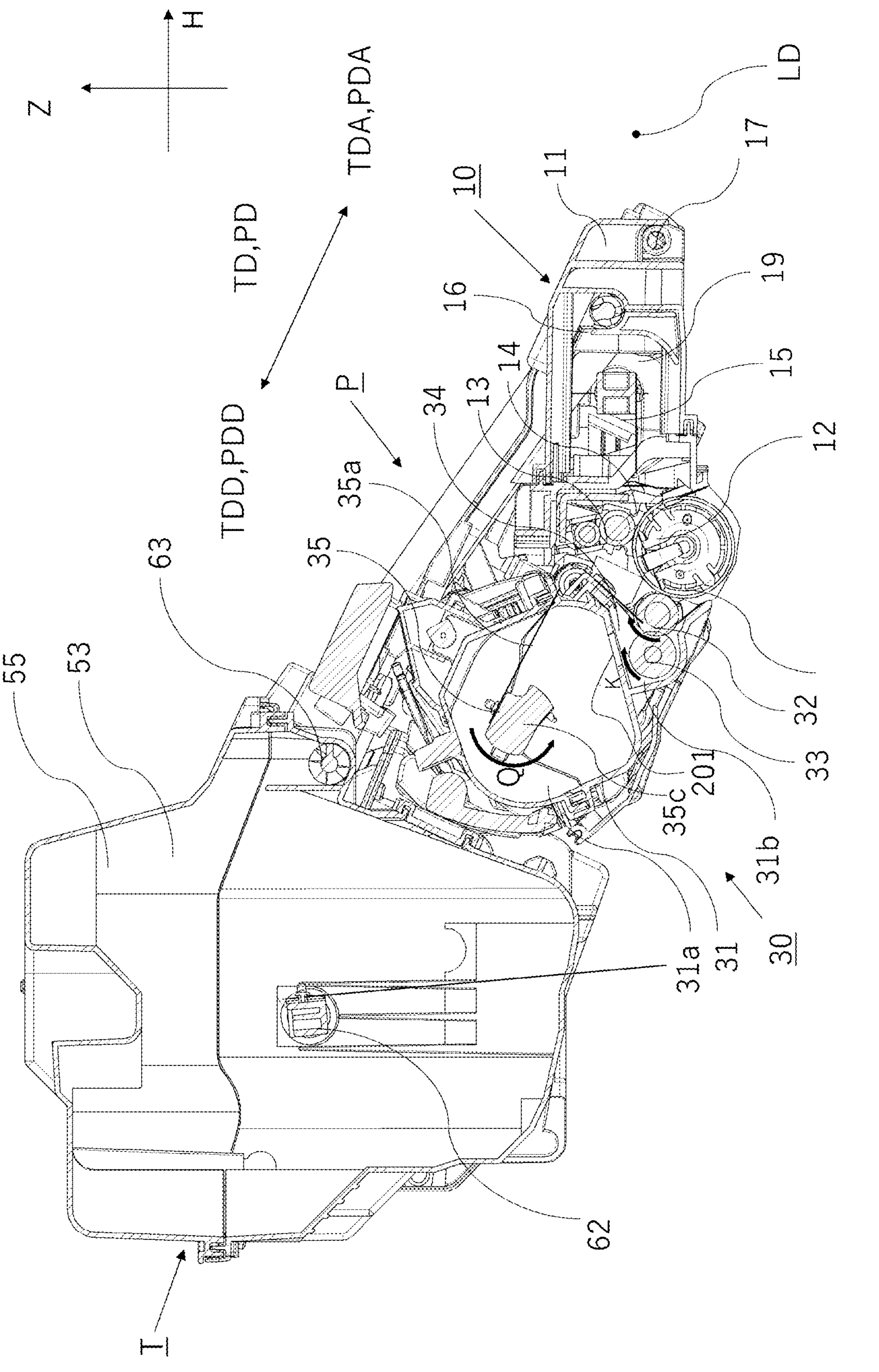
FIG. 7 is a cross sectional view of a process cartridge and a toner cartridge.
Figure 8:
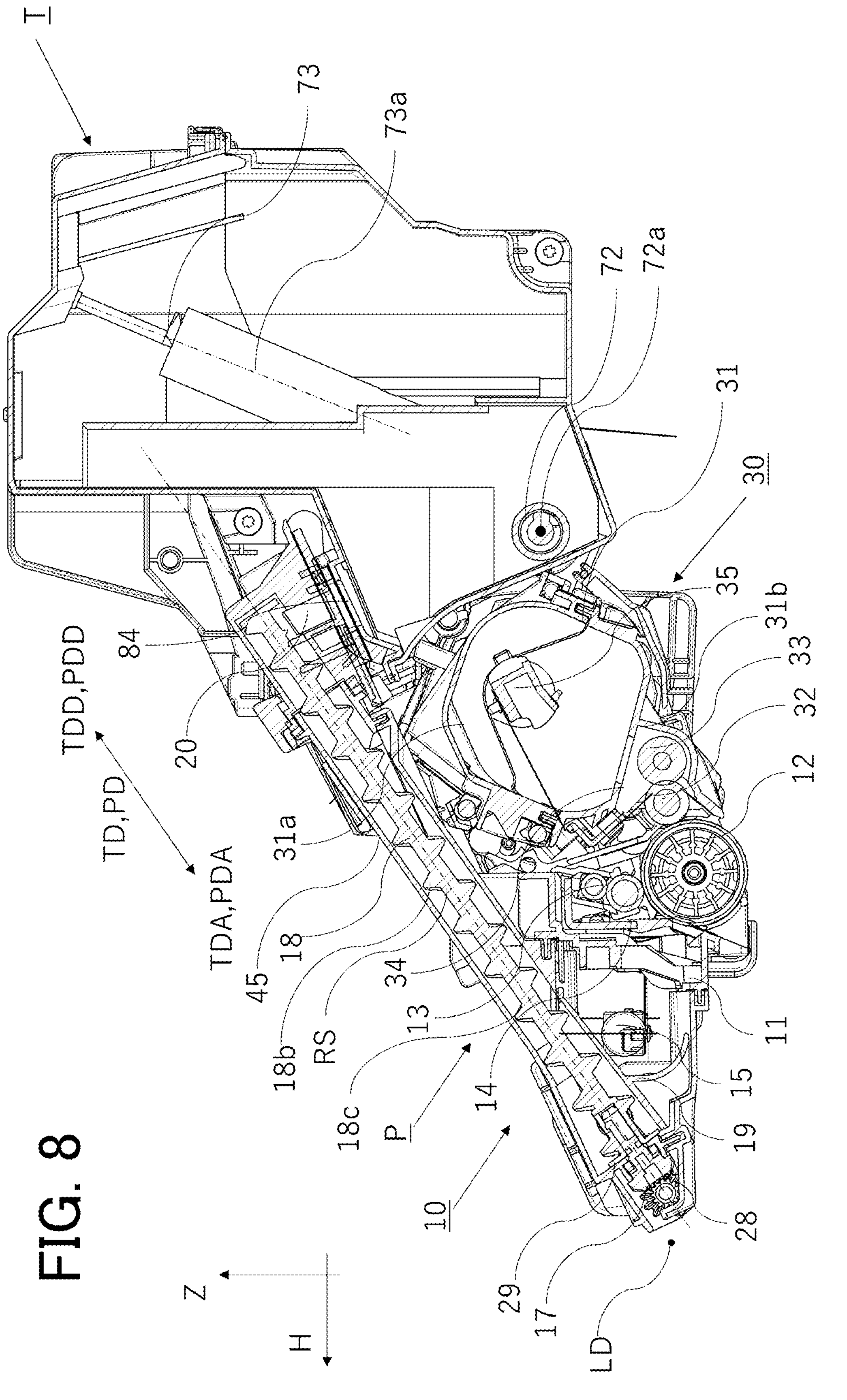
FIG. 8 is a cross sectional view of a process cartridge and a toner cartridge.

As shown in FIGS. 7 and 14, the toner frame body 55 of the toner cartridge Tis provided with a toner accommodation chamber 53 (a first chamber) and a toner collecting chamber 54 (a second chamber). The toner to be supplied to the process cartridge P is accommodated in the toner accommodation chamber 53. The toner returned from the process cartridge P by a return screw 18 shown in FIG. 8 is accommodated in the toner collecting chamber 54.

The toner collecting chamber 54 and the toner accommodation chamber 53 are separated (isolated) from each other. Specifically, the toner frame body 55 has a partition wall **55*b*, and the toner collecting chamber 54 and the toner accommodation chamber 53 are completely partitioned by the partition wall 55*b*. This prevents the toner from moving between the toner collecting chamber 54 and the toner accommodation chamber 53, so that the toner accommodated in the toner collecting chamber 54 and the toner accommodated in the toner accommodation chamber 53** are prevented from being mixed with each other.

The volume of the toner accommodation chamber 53 is larger than the volume of the toner collecting chamber 54. In the present example, in the axis direction LD, the distance between the partition wall **55*b* and the toner non-driving end 55*a*2 is shorter than the distance between the partition wall 55*b* and the toner driving end 55*a*1**.

In the axis direction, the toner accommodation chamber 53 is arranged so as to overlap the center **55*a*3 of the toner frame body 55. On the other hand, in the axis direction LD, the toner collecting chamber 54 is arranged on the non-driving side of the toner frame body 55. In the axis direction LD, the distance between the toner collecting chamber 54 and the toner non-driving end 55*a*2 is shorter than the distance between the toner collecting chamber 54 and the toner driving end 55*a*1. Further, in the axis direction LD, the toner collecting chamber 54 is arranged between the toner accommodation chamber 53 and the toner non-driving end 55*a*2**.

As shown in FIGS. 13 and 14, the toner frame body 55 has a container portion 56 including the toner accommodation chamber 53 and the toner collecting chamber 54, a driving end cover 57 arranged on the driving side of the toner cartridge T, and a non-driving end cover 58 arranged on the non-driving side of the toner cartridge T.

The container portion 56 includes a first container 56*a* provided with the toner accommodation chamber 53, and a second container 56*b* provided with the toner collecting chamber 54. In the present example in which the second container 56*b* is fixed to the first container 56*a*, the sidewall of the first container 56*a* and the sidewall of the second container 56*b* are opposed to each other, and each have a function as the partition wall 55*b*.

As shown in FIGS. 11A and 11B, the toner frame body 55 has a toner discharge port (a first opening) 61 for discharging the toner accommodated in the toner accommodation chamber 53 toward the development unit 30 of the process cartridge P. The toner discharge port 61 establishes a communication between the outside of the toner frame body 55 and the toner accommodation chamber 53, so that the toner accommodated in the toner accommodation chamber 53 is discharged to the outside of the toner frame body 55 through the toner discharge port 61. The toner discharge port 61 is included in the first container 56*a*.

In the axis direction LD, the toner discharge port 61 is arranged closer to the driving side of the toner frame body 55. In the axis direction LD, the distance between the toner discharge port 61 and the toner driving end 55*a*1 is shorter than the distance between the toner discharge port 61 and the toner non-driving end 55*a*2.

The toner discharge port 61 is covered with a discharge port shutter not shown. The discharge port shutter is opened/closed in conjunction with the attachment and the removal of the toner cartridge T with respect to the process cartridge P. With the toner cartridge T attached to the process cartridge P, the toner is allowed to be discharged from the toner discharge port 61. As described above, the development roller 32 of the process cartridge P develops the electrostatic latent image formed on the photosensitive drum 12 by the toner discharged from the toner discharge port 61.

As shown in FIGS. 7 and 14, the toner transport member 62 and the toner transport screw 63 are accommodated in the inside of the toner accommodation chamber 53. The toner transport member 62 and the toner transport screw 63 can be referred to as a first rotation member of the toner cartridge T.

As shown in FIGS. 14 and 15, the toner cartridge T has a toner discharge device 64 for discharging a toner from the toner discharge port 61. The toner discharge device 64 has a pump portion 65 for feeding air by compression, an air guide 66 for guiding the air fed by the pump portion 65 toward the toner discharge port 61, a compression portion 67 for compressing the pump portion 65, and an operation gear 68 for moving the compression portion 67. The operation gear 68 includes an operation groove 68*a* for moving the compression portion 67.

The toner transport member 62 has a fin 62*b* having flexibility, and a shaft 62*c* to which the fin 62*b* is attached, and rotates around the rotation axis 62*a*, thereby transporting a toner toward the toner transport screw 63. As shown in FIG. 15, the fin 62*b* comes in contact with the inner wall of the toner accommodation chamber 53, to be deformed like a broken line from the natural state indicated with a solid line, for transporting the toner. The toner transport screw 63 has a spiral fin 63*b*1 and a screw shaft 63*b*2, and rotates around the rotation axis 63*a*, thereby transporting the toner toward the toner discharge port 61. The spiral fin 63*b*1 and the screw shaft 63*b*2 are integrally formed.

On the other hand, the rotation of the operation gear 68 moves the compression portion 67 in engagement with the operation groove 68*a* in the direction of the rotation axis of the operation gear 68. The movement of the compression portion 67 compresses the pump portion 65, so that the pump portion 65 feeds air toward the toner accommodation chamber 53.

The fed air is guided toward the toner discharge port 61 by an air guide 66. Incidentally, a cover member is arranged in the vicinity of the toner discharge port 61, and the cover member covers a part of the toner transport screw 63. As a result of this, the toner transported by the toner transport member 62 is suppressed from being discharged directly from the toner discharge port 61, and the air released from the air guide 66 goes toward the toner discharge port 61 with efficiency.

Further, as shown in FIGS. 11A and 11B, the toner frame body 55 includes a toner receiving port (second opening) 84 for receiving the toner returned from the process cartridge P. The toner receiving port 84 establishes a communication between the outside of the toner frame body 55 and the toner collecting chamber 54. The toner collecting chamber 54 accommodates the toner (collected toner) discharged from a toner return opening 20 shown in FIG. 8, and having passed through the toner receiving port 84.

In the axis direction LD, the toner receiving port 84 is arranged closer to the non-driving side of the toner frame body 55. Namely, in the axis direction LD, the distance between the toner receiving port 84 and the toner non-driving end 55*a*2 is shorter than the distance between the toner receiving port 84 and the toner driving end 55*a*1. Further, in the axis direction LD, the distance between the toner receiving port 84 and the toner non-driving end 55*a*2 is shorter than the distance between the toner receiving port 84 and the center 55*a*3 of the toner frame body 55.

The toner receiving port 84 is covered with the receiving port shutter 85. The receiving port shutter 85 is opened/closed in conjunction with the attachment and the removal of the toner cartridge T with respect to the process cartridge P.

More specifically, the receiving port shutter 85 is movable between the closing position at which the toner receiving port 84 is covered and the opening position at which the toner receiving port 84 is exposed. As shown in FIG. 8, the attachment of the toner cartridge T to the process cartridge P brings the receiving port shutter 85 into contact with the process cartridge P, and causes the receiving port shutter 85 to move to the opening position. With the toner cartridge T attached to the process cartridge P, the toner receiving port 84 and the toner return opening 20 are opposed to each other.

As shown in FIG. 14, the toner collecting chamber 54 includes a first collecting chamber 69, a second collecting chamber 70, and a third collecting chamber 71. The toner cartridge T has a first collecting screw 72 for transporting a toner from the first collecting chamber 69 to the second collecting chamber 70, and a second collecting screw (second rotation member) 73 for transporting a toner from the second collecting chamber 70 to the third collecting chamber 71. The first collecting screw 72 and the second collecting screw 73 are accommodated in the toner collecting chamber 54.

As shown in FIG. 8, the first collecting screw 72 is rotatable around the rotation axis 72*a*, and the second collecting screw 73 is rotatable around the rotation axis 73*a*. The direction of the rotation axis 72*a* is in parallel with the axis direction LD, and the direction of the rotation axis 73*a* is the direction crossing the axis direction LD. The angle formed between the direction orthogonal to the axis direction LD and the direction of the rotation axis 73*a* is preferably smaller than the angle formed between the axis direction LD and the direction of the rotation axis 73*a*, and the direction of the rotation axis 73*a* is more preferably the direction orthogonal to the axis direction LD.

The toner received from the toner receiving port 84 is accumulated in the first collecting chamber 69, and is transported from the first collecting chamber 69 to the second collecting chamber 70 by the first collecting screw 72. The toner transported to the second collecting chamber 70 is transported upward in the vertical direction by the second collecting screw 73, and is transported from the second collecting chamber 70 to the third collecting chamber 71.

As shown in FIGS. 16A and 16B, the toner cartridge T has a second toner coupling 74, a first toner coupling 75, a transport gear 76, and a discharge gear 77.

The operation gear 68, the second toner coupling 74, the first toner coupling 75, the transport gear 76, and the discharge gear 77 are arranged on the driving side of the toner cartridge T. In other words, in the axis direction LD, the distance between the second toner coupling 74 or the first toner coupling 75, and the toner driving end 55*a*1 is shorter than the distance between the second toner coupling 74 or the first toner coupling 75, and the toner non-driving end 55*a*2.

The driving end cover 57 shown in FIGS. 13 and 16A covers at least a part of the operation gear 68, the second toner coupling 74, the first toner coupling 75, the transport gear 76, and the discharge gear 77, and has a driving side toner guide 51. The driving end cover 57 covers at least a part of the pump portion 65.

The transport gear 76 is coupled with the toner transport member 62, and the discharge gear 77 is coupled with the toner transport screw 63. The second toner coupling 74 receives a driving force (external force) from the apparatus main body 100A, and rotates the transport gear 76. As a result, the toner transport member 62 is rotated. The first toner coupling 75 is in engagement with the operation gear 68 via an idler gear, and the operation gear 68 is in engagement with the discharge gear 77. The first toner coupling 75 receives a driving force (external force) from the apparatus main body 100A, and rotates the operation gear 68 and the discharge gear 77. As a result, the pump portion 65 is compressed, so that the toner transport screw 63 is rotated.

In other words, the second toner coupling 74 has a function as a drive member for driving the toner transport member 62. The first toner coupling 75 has a function as a drive member for driving the toner discharge device 64 and the toner transport screw 63.

As shown in FIG. 17, the toner cartridge T has a detection member 78 for detecting the toner amount in the toner collecting chamber 54. The non-driving end cover 58 covers the detection member 78, and has the non-driving side toner guide 52.

The detection member 78 in the present example is a light guide pair for guiding a light. The detection member 78 includes a light guide member 78*al* and a light guide member 78*a*2, and is arranged on the non-driving side of the toner cartridge T. In other words, in the axis direction LD, the distance between the light guide member 78*al* or the light guide member 78*a*2, and the toner non-driving end 55*a*2 is shorter than the distance between the light guide member 78*al* or the light guide member 78*a*2, and the toner driving end 55*a*1.

A part of the light guide member 78*a*1 and a part of the light guide member 78*a*2 are exposed at the toner collecting chamber 54. One of the light guide member 78*a*1 and the light guide member 78*a*2 guides a light toward the inside of the toner collecting chamber 54 from the outside of the toner collecting chamber 54. The light guided to the inside of the toner collecting chamber 54 passes through the toner collecting chamber 54. The other of the light guide member 78*a*1 and the light guide member 78*a*2 guides a light to the outside of the toner collecting chamber 54 from the inside of the toner collecting chamber 54.

The control portion 107 of the apparatus main body 100A can detect the toner amount on the basis of the light that has passed through the inside of the toner collecting chamber 54 via the light guide member 78*a*1 and the light guide member 78*a*2. Incidentally, as the detection member 78, a mutually opposing electrode pair can be used. In this case, the control portion 107 of the apparatus main body 100A can detect the toner amount on the basis of the change in electrostatic capacity between the electrode pair.

Process Cartridge

Referring to FIGS. 3 to 10, the configuration of the process cartridge P in accordance with the present example will be described in further details.

FIGS. 7 and 8 are each a cross sectional view of the process cartridge P and the toner cartridge T. Specifically, FIGS. 7 and 8 are each a cross sectional view of the process cartridge P and the toner cartridge T with the direction orthogonal to the axis direction LD assumed as the cross sectional direction. FIG. 8 is a view obtained by cutting the process cartridge P and the toner cartridge T along the rotation axis RS of a return screw 18 described later.

Figure 9:
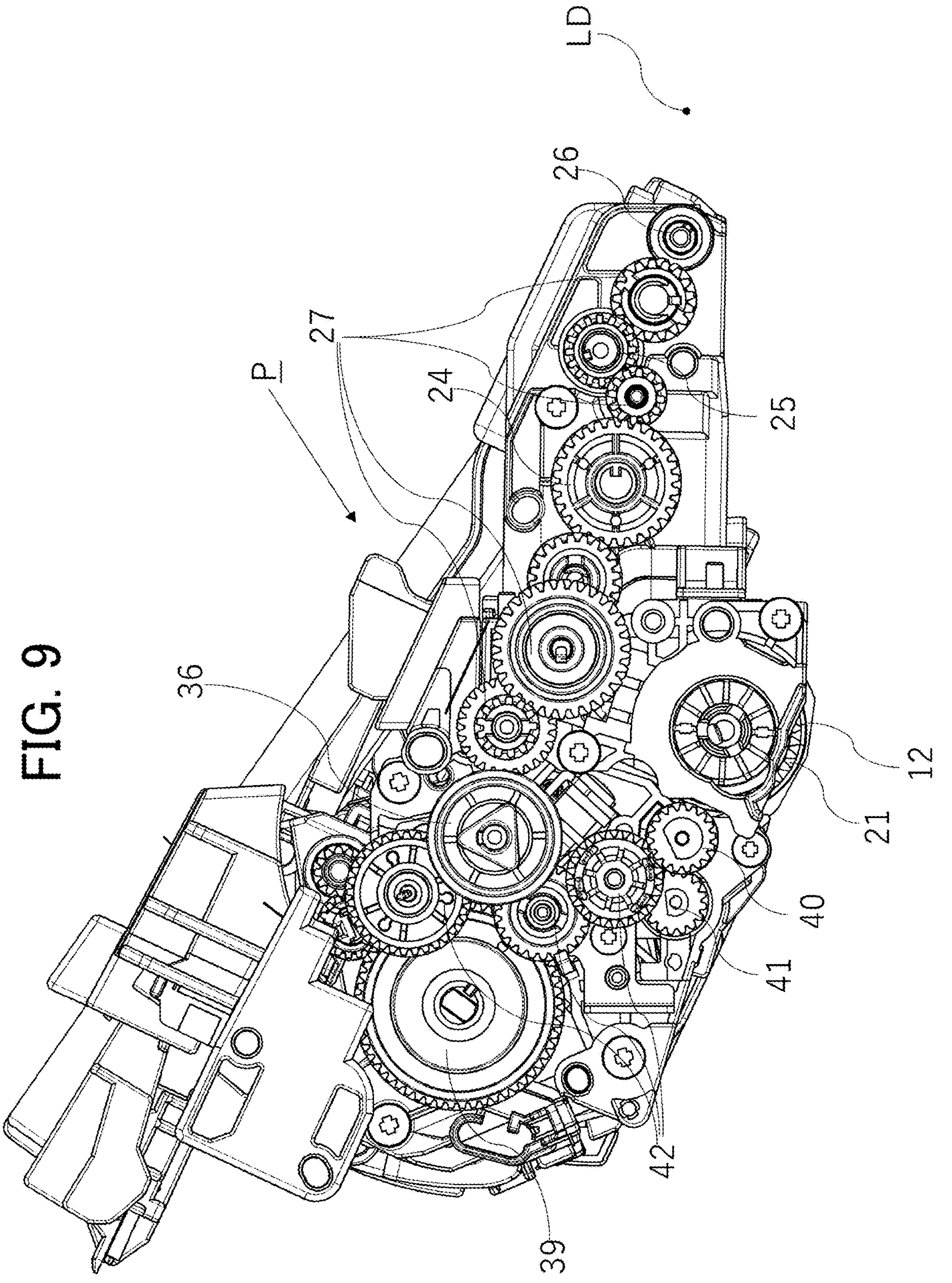
FIG. 9 is a side view for illustrating a driving transmission path of a process cartridge.

FIG. 9 is a side view for illustrating the driving transmission path of the process cartridge P. FIG. 10 is a view of the process cartridge P and the toner cartridge T as seen in the removal direction PDD.

The process cartridge P includes the development unit 30 and the drum unit 10. The development unit 30 is movably (rotatably) coupled with respect to the drum unit 10. As shown in FIGS. 5 and 6, the process cartridge P has a driving side spring 37 and a non-driving side spring 38, and the driving side spring 37 and the non-driving side spring 38 are attached to the drum unit 10 and the development unit 30. The driving side spring 37 and the non-driving side spring 38 bias the development unit 30 so that the development roller 32 may be pressed against the photosensitive drum 12.

As shown in FIGS. 7 and 8, the development unit 30 has a development frame body 31, a development roller 32 (a developer bearing member) for bearing a toner, a supply roller 33 (a supply member) for coming in contact with the development roller 32, and supplying a toner, a development blade 34, and a stirring unit 35 (a stirring member). The development frame body 31 supports the development roller 32, the supply roller 33, the development blade 34, and the stirring unit 35. The development frame body 31 is provided with a developer accommodation chamber 31*a* and a development chamber 31*b*.

Figure 1A:
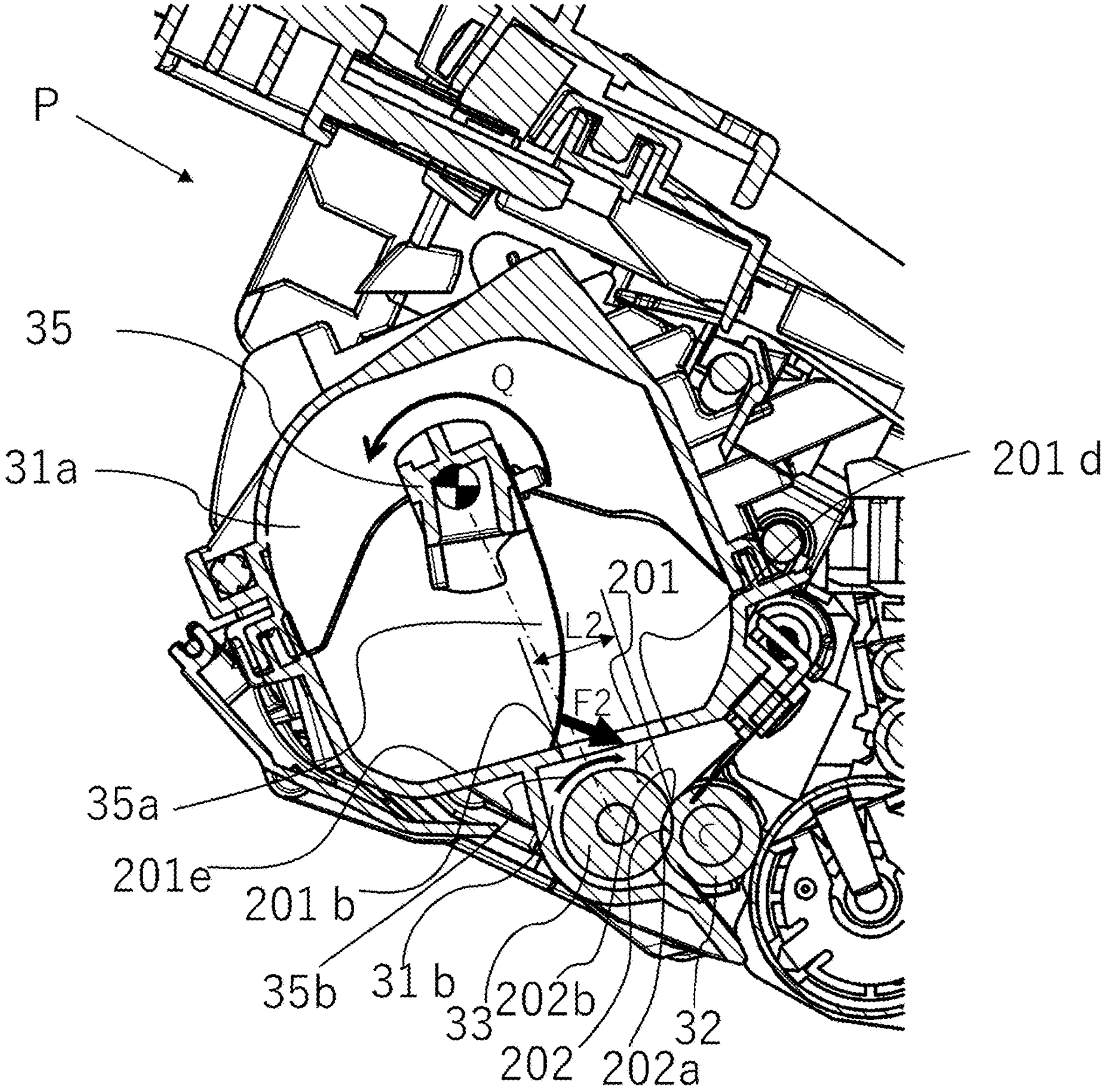
FIG. 1A is a cross sectional view showing a shape of an opening of a development unit.

The developer accommodation chamber 31*a* is set at the top in the gravity direction of the development chamber 31*b* via a wall surface portion 201*e* that is a partition sheet shown in FIG. 1A. Further, the wall surface portion 201*e* is provided with an opening 201 for establishing a communication between the developer accommodation chamber 31*a* and the development chamber 31*b*.

In the developer accommodation chamber 31*a*, a stirring unit 35 is arranged. In the development chamber 31*b*, the development roller 32, the supply roller 33, and the development blade 34 are arranged.

The stirring unit 35 includes a rotatively supported stirring shaft 35*c*, and a flexible sheet member 35*a* fixed to the stirring shaft 35*c*.

As shown in FIG. 7, the supply roller 33 rotates in the same direction as that of the development roller 32 (an arrow K direction), and the stirring unit 35 rotates in the opposite direction to that of the supply roller 33 (an arrow Q direction). Further, the longitudinal direction of the supply roller 33 in the development unit 30 will be hereinafter referred to as a longitudinal direction.

The toner supplied from the toner cartridge T is accommodated in the developer accommodation chamber 31*a*. The stirring unit 35 transports the toner accommodated in the developer accommodation chamber 31*a* to the development chamber 31*b*. The toner transported to the development chamber 31*b* is supplied to the development roller 32 by the supply roller 33 that comes in contact with the development roller 32 to be rotated. The toner supplied to the development roller 32 is regulated by the development blade 34, so that a toner layer is formed on the surface of the development roller 32. The development blade 34 has a function as a layer thickness regulating member for regulating the thickness of the toner layer.

As shown in FIGS. 7 and 8, the drum unit 10 has a drum frame body 11, a photosensitive drum 12 (image bearing member), a charging roller 13, a cleaning blade 14, an intermediate transport member 15, an intermediate screw 16, a transmission shaft 17, and a return screw 18. The drum frame body 11 supports the photosensitive drum 12, the charging roller 13, the cleaning blade 14, the intermediate transport member 15, the intermediate screw 16, the transmission shaft 17, and the return screw 18. Further, the drum unit 10 has a memory tag 90P described later.

The drum frame body 11 includes a cleaning collecting chamber 19. In the cleaning collecting chamber 19, the intermediate transport member 15, the intermediate screw 16, and the return screw 18 are arranged.

As shown in FIG. 8, the drum frame body 11 includes a return path 45 for accommodating the return screw 18. The return path 45 can be said to be a part of the cleaning collecting chamber 19.

The charging roller 13 is in contact with the photosensitive drum 12, and is rotated by the photosensitive drum 12. The cleaning blade 14 is in contact with the photosensitive drum 12, and collects the toner left on the surface of the photosensitive drum 12. The collected toner (the waste toner, the residual toner, or the recovered toner) is accommodated in the cleaning collecting chamber 19. The collected toner is transported toward the intermediate screw 16 by the intermediate transport member 15, and the intermediate screw 16 transports the collected toner toward the return screw 18. The intermediate transport member 15 transports the collected toner toward the direction crossing the axis direction LD. The intermediate screw 16 transports the collected toner along the axis direction LD.

The return screw (rotation member) 18 rotates around the rotation axis (the second axis) RS shown in FIG. 6. The direction of extension of the rotation axis RS of the return screw 18 is referred to as the rotation axis direction (the second direction) of the return screw 18.

The rotation axis direction of the return screw 18 is the direction crossing the axis direction LD. The angle formed between the direction orthogonal to the axis direction LD and the rotation axis direction of the return screw 18 is preferably smaller than the angle formed between the axis direction LD and the rotation axis direction of the return screw 18, and the rotation axis direction of the return screw 18 is more preferably the direction orthogonal to the axis direction LD.

As shown in FIG. 8, the drum frame body 11 includes a return opening 20. The return opening 20 establishes a communication between the return path 45 of the cleaning collecting chamber 19 and the outside of the drum frame body 11, and is opposed to the return screw 18. The collected toner delivered to the return screw 18 from the intermediate screw 16 is transported toward the return opening 20 by the return screw 18 and is discharged from the return opening 20, to pass through a toner receiving port 84 described later, and to be received by the toner cartridge T.

Thus, the return screw 18 has a function as a transport member for transporting the toner collected from the photosensitive drum 12 toward the toner receiving port 84. The direction of transport of the collected toner by the return screw 18 is the direction toward the toner cartridge T from the process cartridge P, and the upward direction in the vertical direction.

The return screw 18 has the spiral fin 18*b* and the screw shaft 18*c*, and rotates around the rotation axis RS, thereby transporting the toner toward the return opening 20. The spiral fin 18*b* and the screw shaft 18*c* are integrally formed.

As shown in FIGS. 3 and 5, the process cartridge P has a process coupling 36 (a first input portion or a development drive member), and a drum gear 21 (a second input portion or a drum drive member). The engagement of the process coupling 36 with the main body coupling of the apparatus main body 100A results in the transmission of a driving force (an external force) from the apparatus main body 100A to the process coupling 36. The engagement of the drum gear 21 with the main body gear of the apparatus main body 100A results in the transmission of a driving force (an external force) from the apparatus main body 100A to the drum gear 21, so that the drum gear 21 rotates. The rotation of the drum gear 21 drives and rotates the photosensitive drum 12.

In the present example, the process coupling 36 and the drum gear 21 are arranged on the driving side of the process cartridge P. Namely, in the axis direction LD, the distance between the process driving end 11*f*1 and the process coupling 36 is shorter than the distance between the process non-driving end 11*f*2 and the process coupling 36. Similarly, in the axis direction LD, the distance between the process driving end 11*f*1 and the drum gear 21 is shorter than the distance between the process non-driving end 11*f*2 and the drum gear 21.

As shown in FIG. 9, the process cartridge P has a stirring gear 39 for driving the stirring unit 35, a development gear 40 for driving the development roller 32, and a supply gear 41 for driving the supply roller 33. The stirring gear 39, the development gear 40, and the supply gear 41 are coupled to the process coupling 36 via a plurality of the idler gears 42.

The rotation of the process coupling 36 drives and rotates the development roller 32, the supply roller 33, and the stirring unit 35.

Further, the process cartridge P has an intermediate transport gear 24 for driving the intermediate transport member 15, an intermediate screw gear 25 for driving the intermediate screw 16, and a shaft gear 26 for driving the transmission shaft 17. The intermediate transport gear 24, the intermediate screw gear 25, and the shaft gear 26 are coupled to the process coupling 36 via a plurality of the idler gears 27. The rotation of the process coupling 36 rotates the intermediate transport member 15, the intermediate screw 16, and the transmission shaft 17.

As shown in FIG. 8, the return path 45 and the return screw 18 are arranged on the non-driving side of the process cartridge P. In other words, in the axis direction LD, the distance between the return screw 18 and the process non-driving end **11*f*2 is shorter than the distance between the return screw 18 and the process driving end 11*f*1**.

More specifically, as shown in FIG. 10, in the axis direction LD, the distance between the rotation axis RS of the return screw 18 and the process non-driving end **11*f*2 is shorter than the distance between the rotation axis RS and the process driving end 11*f*1. Whereas, in the axis direction LD, the distance between the rotation axis RS and the process non-driving end 11*f*2 is shorter than the distance between the rotation axis RS and the center 11*f*3 of the drum frame body 11**.

As shown in FIG. 8, the transmission shaft 17 is attached to the transmission gear 28, and a return gear 29 to be in engagement with the transmission gear 28 is attached to the return screw 18. The transmission gear 28 and the return gear 29 are bevel gears, so that the rotation of the transmission shaft 17 rotates the return screw 18. Namely, the driving force transmitted to the process coupling 36 is transmitted from the driving side of the process cartridge P to the non-driving side of the process cartridge P by the transmission shaft 17, and is transmitted to the return screw 18. In other words, the process coupling 36 is configured so as to drive the return screw 18.

As shown in FIG. 10, the transmission shaft 17 is arranged outside the cleaning collecting chamber 19, and the transmission gear 28 and the return gear 29 are in engagement with each other outside the cleaning collecting chamber 19.

As shown in FIGS. 4 and 6, a development roller electrode **32*a* (a development roller contact), a development blade electrode 34*a* (a development blade contact), a supply roller electrode 33*a* (a supply roller contact) and a charging roller electrode 13*a* (a charging contact) are arranged on the non-driving side of the process cartridge P. In other words, the distance between the process non-driving end 11*f*2 and the charging roller electrode 13*a* is shorter than the distance between the process driving end 11*f*1 and the charging roller electrode 13*a*. Similarly, the distance between the process non-driving end 11*f*2, and the development roller electrode 32*a*, the development blade electrode 34*a*, or the supply roller electrode 33*a* is shorter than the distance between the process driving end 11*f*1, and the development roller electrode 32*a*, the development blade electrode 34*a*, or the supply roller electrode 33*a***.

The development roller electrode **32*a*, the development blade electrode 34*a*, the supply roller electrode 33*a*, and the charging roller electrode 13*a* are electrically connected with the development roller 32, the development blade 34, the supply roller 33, and the charging roller 13, respectively. When an image formation operation is performed, the development roller electrode 32*a*, the development blade electrode 34*a*, the supply roller electrode 33*a*, and the charging roller electrode 13*a* are applied with a prescribed voltage from the power supply portion 170 of the apparatus main body 100**A.

Each material for the development roller electrode **32*a*, the development blade electrode 34*a*, the supply roller electrode 33*a*, and the charging roller electrode 13*a*** may be a metal, or may be a resin having conductivity.

Incidentally, in the present example, the direction of each rotation axis of the development roller 32, the supply roller 33, the stirring unit 35, the charging roller 13, the intermediate transport member 15, the intermediate screw 16, and the transmission shaft 17 is in parallel with the axis direction LD. The direction of the rotation axis of each gear except for the process coupling 36, the drum gear 21, and the return gear 29 is also in parallel with the axis direction LD.

Figure 1B:
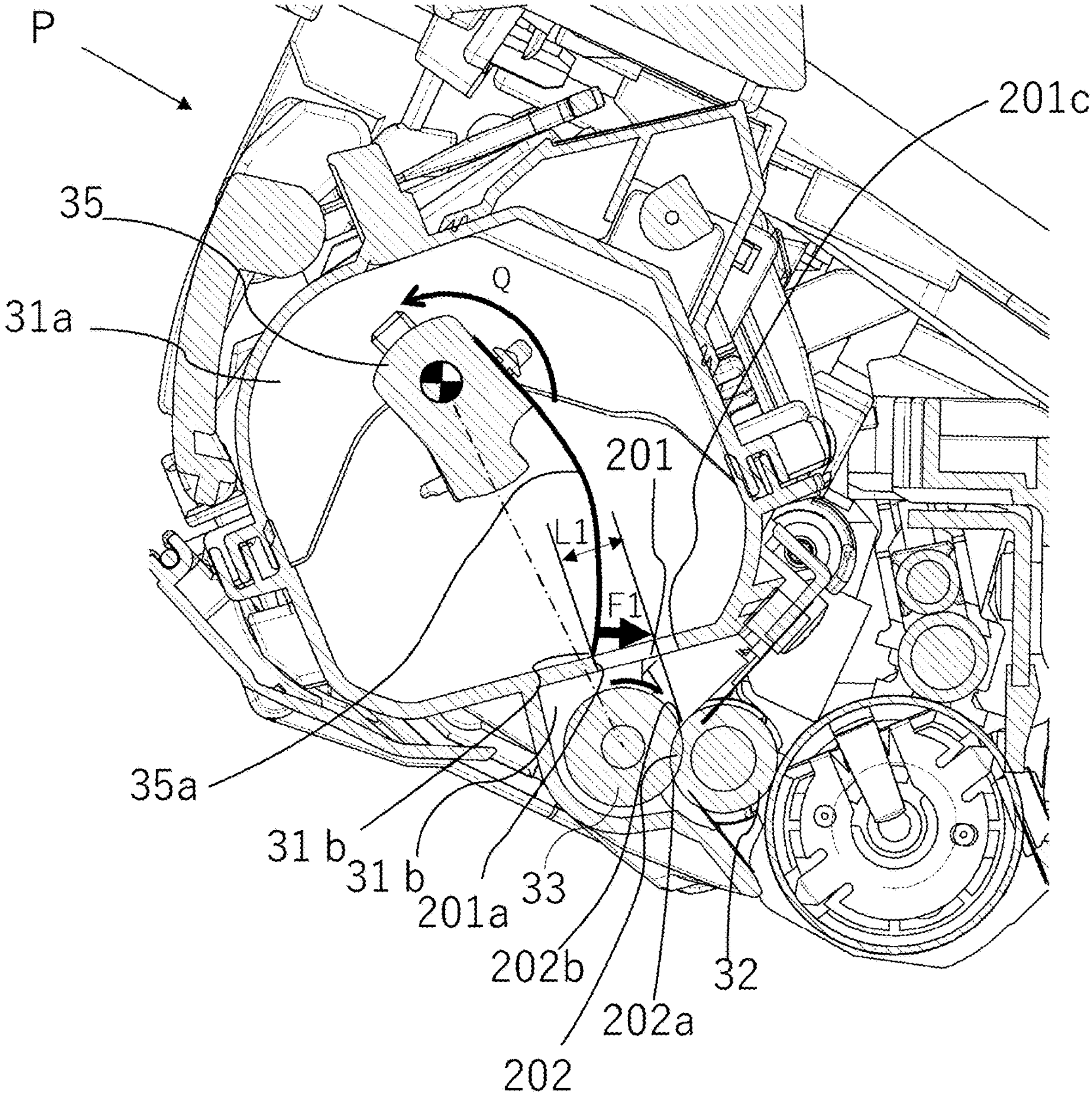
FIG. 1B is a cross sectional view showing a shape of an opening of a development unit.

With Regard to Detailed Configuration of Inside of Development Unit 30 Characteristic of the Present Invention Referring to FIGS. 1A and 1B, a description will be given to the shape of the opening 201 of the development unit 30 in accordance with the present invention. FIG. 1A is a side surface cross sectional view of the development unit showing the shape of the opening 201 at the end in the longitudinal direction. FIG. 1B is a side surface cross sectional view of the development unit showing the shape of the opening 201 at the central portion in the longitudinal direction.

As shown in FIG. 1A, in the cross sectional view of the end in the longitudinal direction, the opening 201 is formed by being partitioned by a second end **201*b* situated on the upstream side in a rotation direction Q of the stirring unit 35, and a fourth end 201*d* situated on the downstream side in the rotation direction Q of the stirring unit 35. The second end 201*b* is the opening end on the upstream side at the end in the longitudinal direction, and the fourth end 201*d*** is the opening end at the end on the downstream side in the longitudinal direction.

As shown in FIG. 1B, in the cross sectional view of the central portion in the longitudinal direction, the opening 201 is formed by being partitioned by a first end **201*a* situated on the upstream side in the rotation direction Q of the stirring unit 35, and a third end 201*c* situated on the downstream side in the rotation direction Q of the stirring unit 35. The first end 201*a* is the opening end on the upstream side at the central portion in the longitudinal direction, and the third end 201*c*** is the opening end on the downstream side at the central portion in the longitudinal direction.

The length of the sheet member **35*a* of the stirring unit 35 will be described. The distance between the rotation axis center of the stirring unit 35 and the free tip portion of the sheet when the sheet member 35*a* has no flexure is referred to as the "free distance of sheet". Whereas, the distance between the rotation center of the stirring unit 35 and the first end 201*a* is referred to as the "center-end distance at central portion". Further, the distance between the rotation center of the stirring unit 35 and the second end 201*b* is referred to as the "center-end distance at end". At this step, the "free distance of sheet" is longer than the "center-end distance at central portion" and the "center-end distance at end". Therefore, the sheet member 35*a* of the stirring unit 35 is configured to come in contact with the wall surface portion 201*e* in the vicinity of the opening 201 of the developer accommodation chamber 31*a* while bending, and to feed a developer of the developer accommodation chamber 31*a* into the development chamber 31*b*** with stirring.

Herein, the contact region of the supply roller 33 with the development roller 32 is referred to as a contact region 202. As shown in the cross sectional view, when the supply roller 33 bites into the development roller 32 by a prescribed distance, the contact region 202 may be at the position of the center of the biting region, may be the end, or may be at other prescribed positions. At this step, the position of the first end 201*a* of the opening 201 is set on the side closer to the contact region 202 of the supply roller 33 than the second end 201*b* of the opening 201. Specifically, the relationship of "distance L1 between first end 201*a* and contact region 202"<"distance L2 between second end 201*b* and contact region 202" holds. At this step, the distance L1 and the distance L2 are not limited to the distance between the end and the contact region 202, but may be the distance between the end and the inlet portion 202*a*, or the distance between the end and an outlet portion 202*b*.

Further, in FIG. 1A, for measuring the distance L2, the distance between the line passing through the second end 201*b*, and perpendicular to the wall surface portion 201*e*, and the line passing through the contact region 202, and perpendicular to the wall surface portion 201*e* is measured. Whereas, in FIG. 1B, for measuring the distance L1, the distance between the line passing through the first end 201*a*, and perpendicular to the wall surface portion 201*e*, and the line passing through the contact region 202, and perpendicular to the wall surface portion 201*e* is measured. However for example, not the line perpendicular to the wall surface portion 201*e*, but the line connecting the second end 201*b* (or the first end 201*a*) and the rotation axis center of the stirring unit 35 may be used. Alternatively, the distance between the second end 201*b* (or the first end 201*a*) and the contact region 202 may be directly measured.

Additional Configuration

Figure 18A:
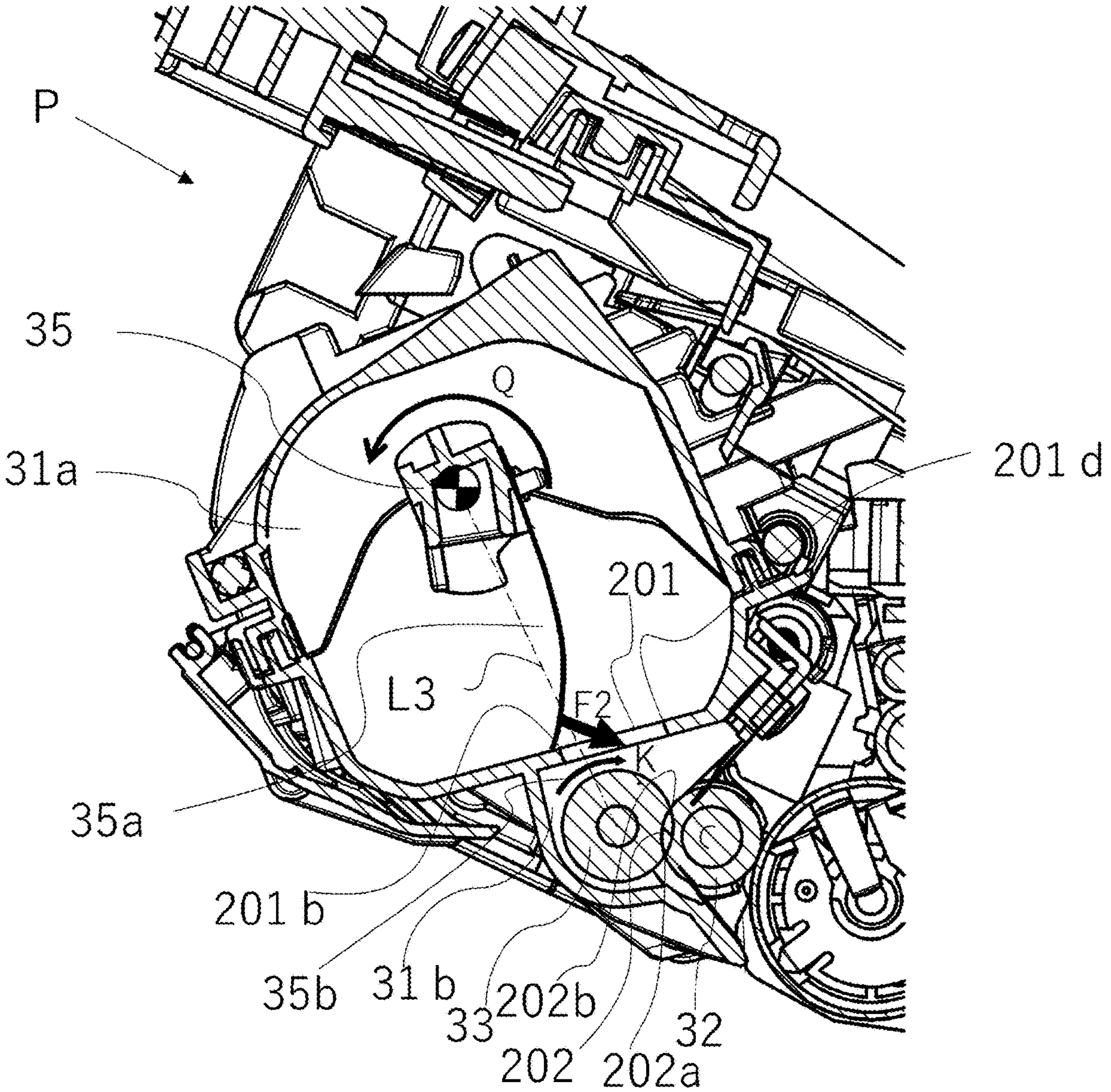
FIG. 18A is a cross sectional view showing a position and a shape of an opening of a development unit.

In addition to the configurations up to this point, further, in the present example, each of the first end 201*a* and the second end 201*b* is set at a more effective position. Below, a description will be given by reference to the side surface cross sectional view of each development unit shown in FIGS. 18A and 18B. FIG. 18A shows the shape of the opening 201 at each opposite end in the longitudinal direction, and FIG. 18B shows the shape of the opening 201 at the central portion in the longitudinal direction.

Figure 18B:
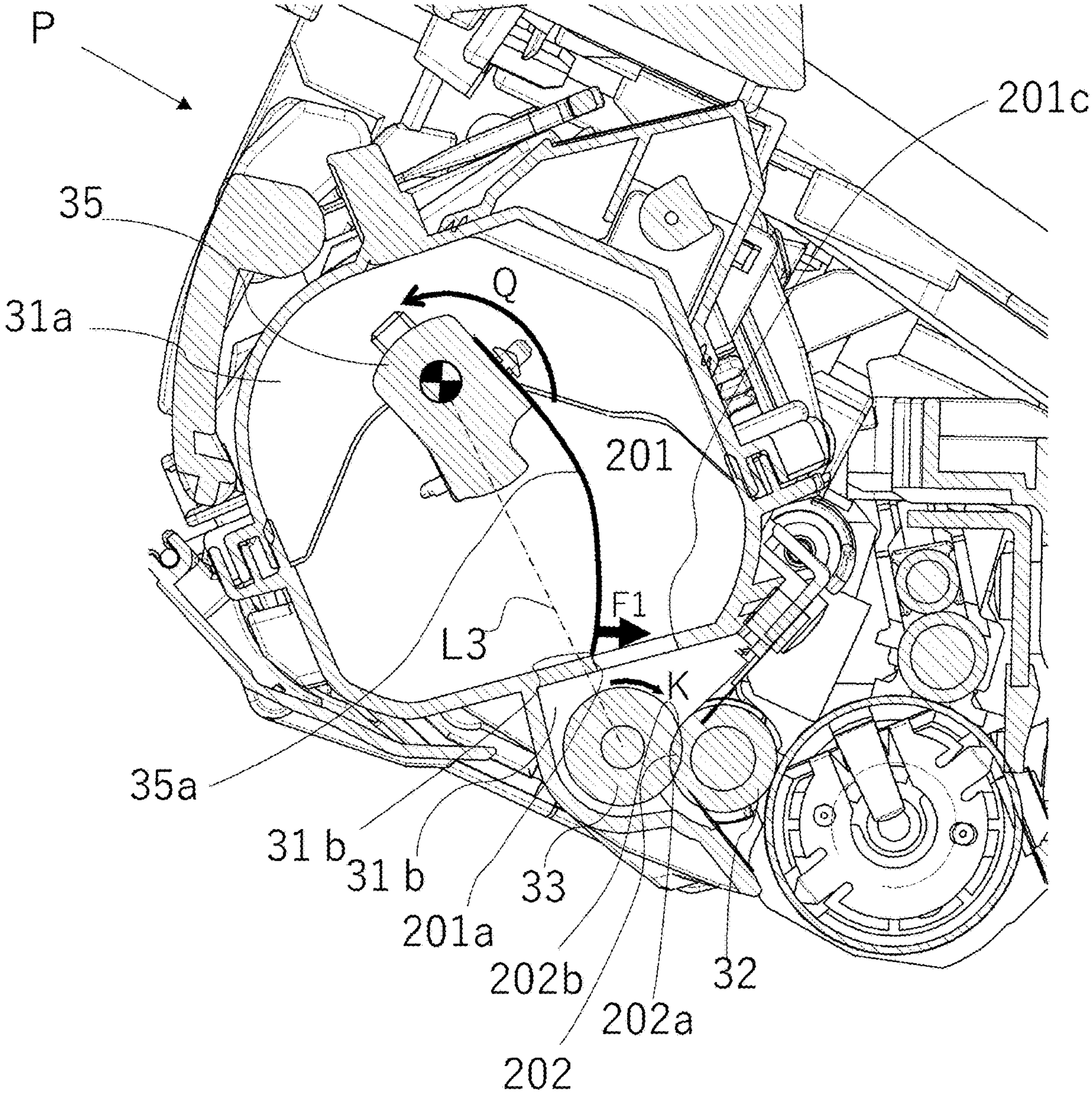
FIG. 18B is a cross sectional view showing a position and a shape of an opening of a development unit.

As shown in FIGS. 18A and 18B, the line connecting the stirring shaft center and the supply roller center is referred to as L3. As shown in FIG. 18B, the first end 201*a* of the opening 201 is situated downstream of L3 in the rotation direction Q of the stirring unit 35. On the other hand, as shown in FIG. 18A, the second end 201*b* of the opening 201 is situated upstream of L3 in the rotation direction Q of the stirring unit 35.

Figure 20:
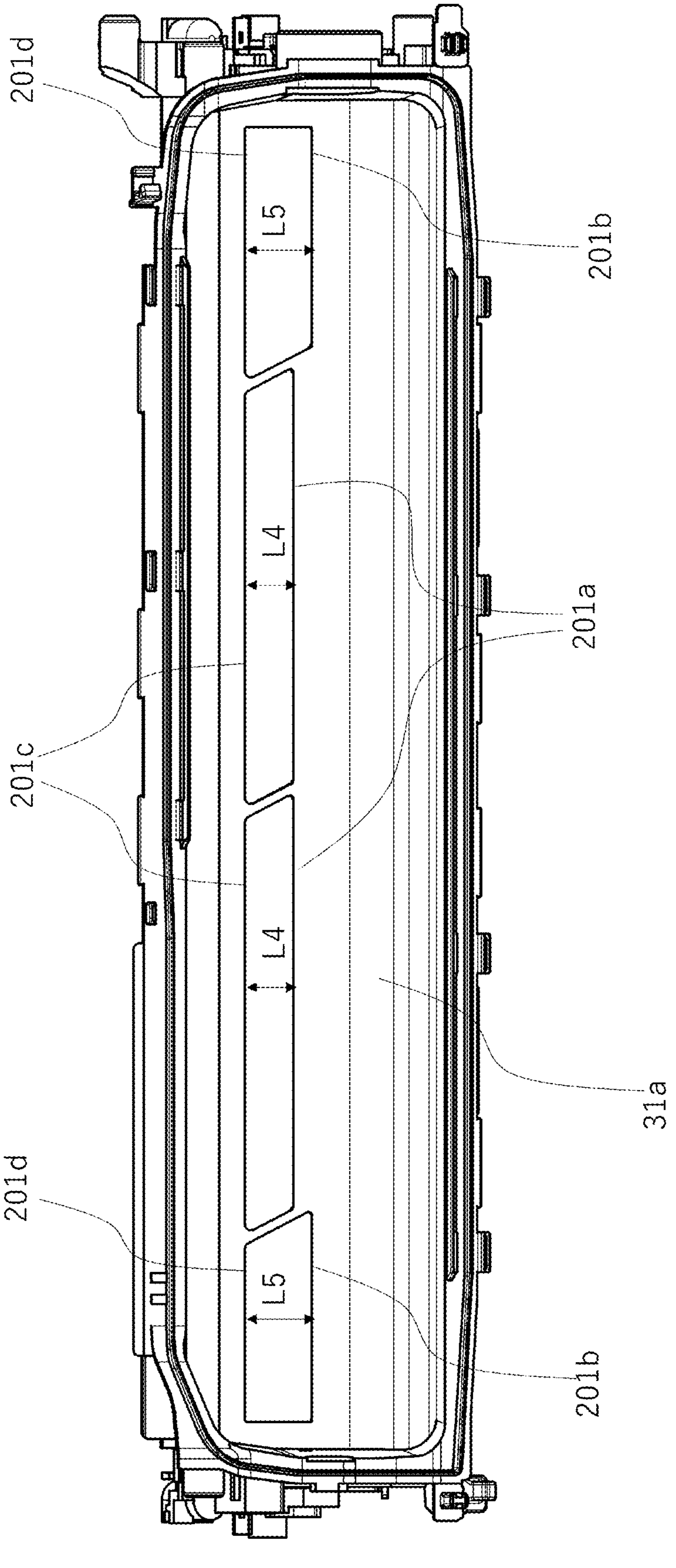
FIG. 20 is a cross sectional view showing a shape of an opening of a development unit.

Further, the size of the opening 201 in the present example will be described by reference to FIG. 20. FIG. 20 is a view of the opening 201 as seen in the front direction from the inside of the developer accommodation chamber 31*a*. In the present Example, as shown in FIG. 20, the opening 201 satisfies the relationship of "distance L4 between first end 201*a* and third end 201*c*"< "distance L5 between second end 201*b* and fourth end 201*d*".

Figure 22A:
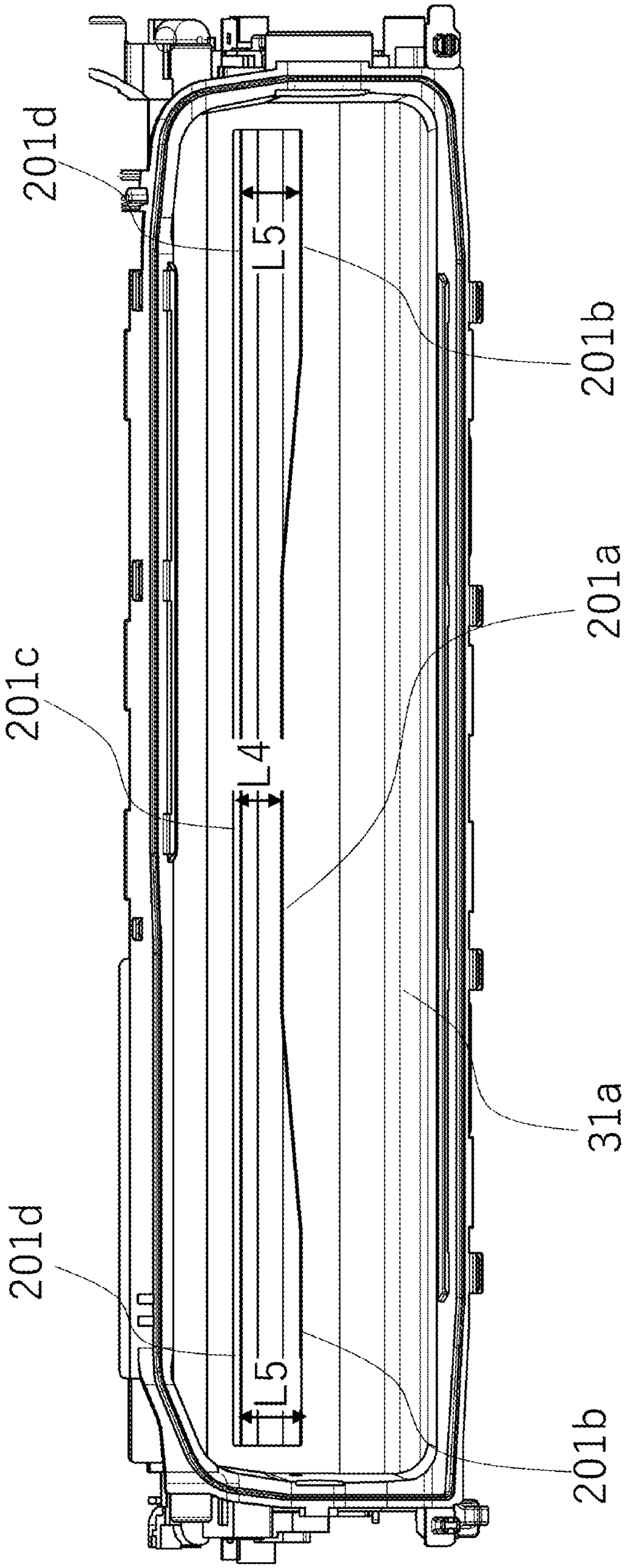
FIG. 22A is a cross sectional view showing a shape of an opening of a development unit.
Figure 22B:
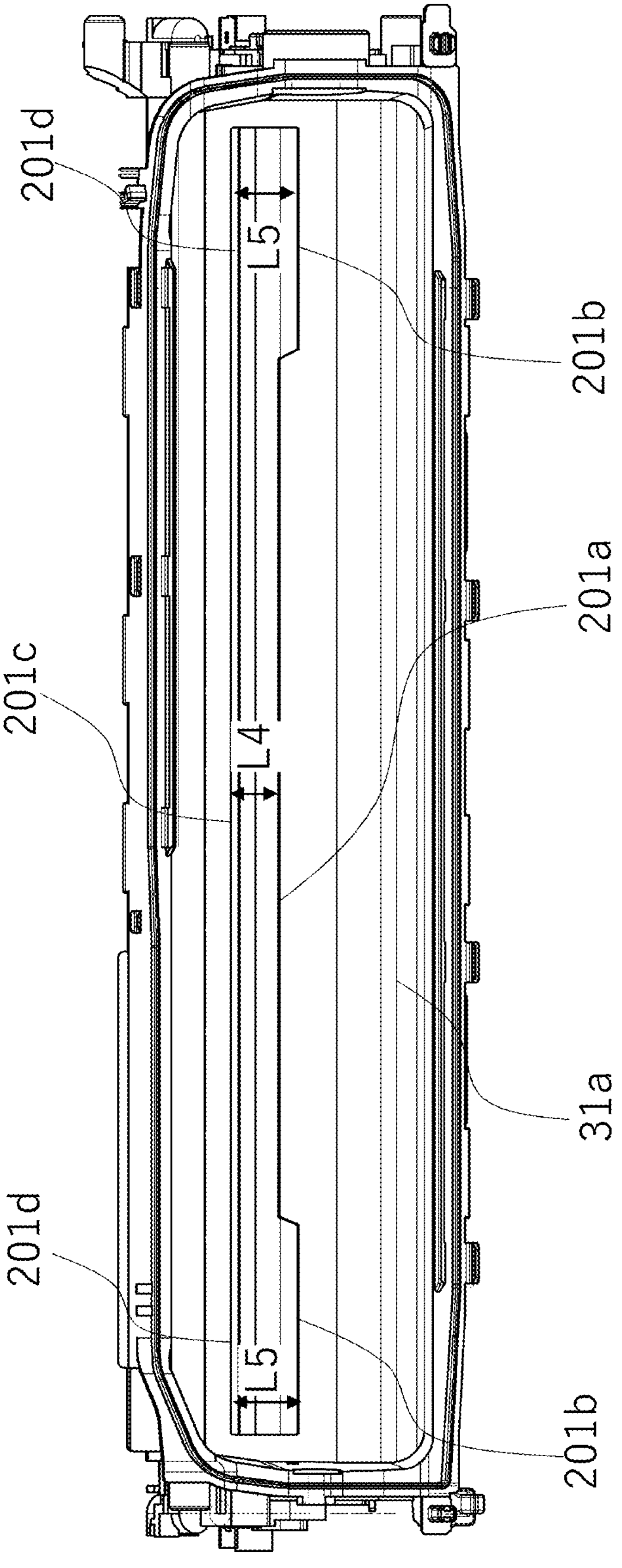
FIG. 22B is a cross sectional view showing a shape of an opening of a development unit.

Herein, the shape of the opening 201 may be the shape as shown in FIGS. 22A and 22B. FIGS. 22A and 22B are each a view of the opening 201 as seen in the front direction from the inside of the developer accommodation chamber 31*a*, showing another shape example of the opening 201.

The shape without a partition of the opening 201 in the longitudinal direction as shown in FIG. 22A, or the shape in which the first end 201*a* and the second end 201*b* of the opening 201 continuously change in the longitudinal direction as shown in FIG. 22B is also acceptable. Further, the shape of the opening 201 is not limited to the examples so long as it satisfies the positional relationship previously described.

Description of Circulation of Developer Inside Development Unit 30

Figure 19A:
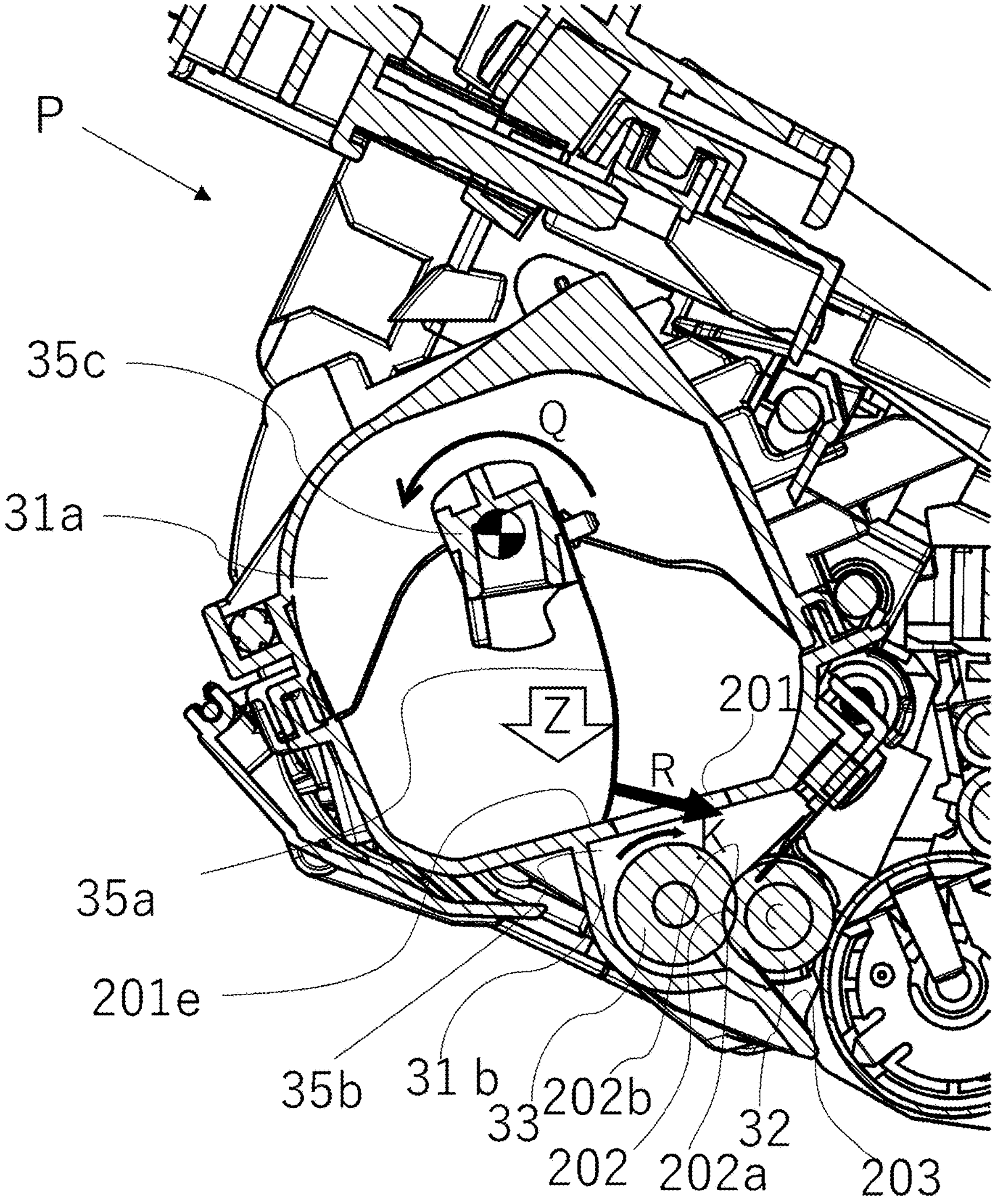
FIG. 19A is a cross sectional view showing the movement of a developer in a process cartridge.
Figure 19B:
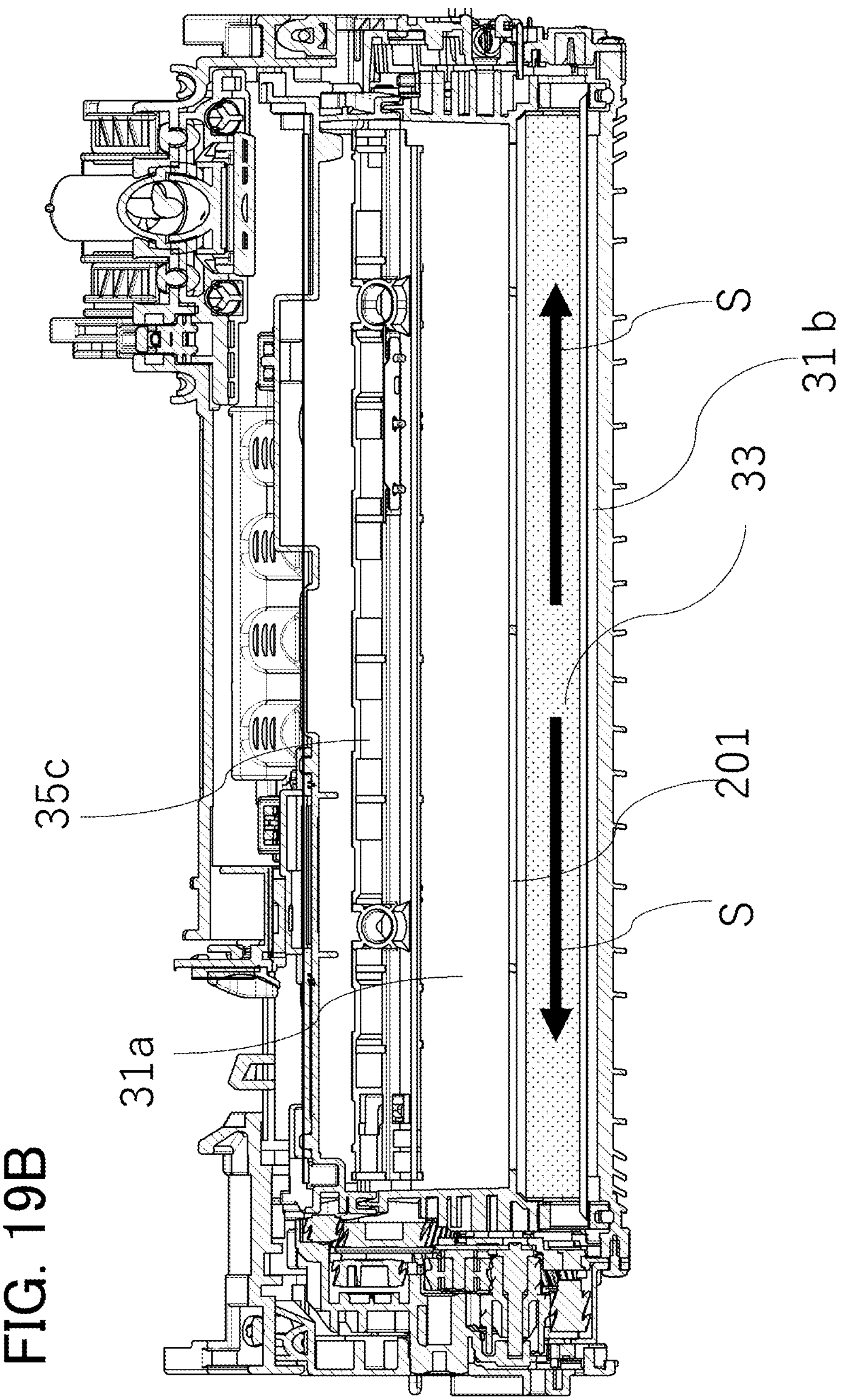
FIG. 19B is a cross sectional view showing a movement of a developer in a process cartridge.

Below, referring to FIGS. 19A and 19B, a description will be given to the circulation of the developer inside the development unit 30. FIG. 19A is a cross sectional view of the development unit 30 as seen in the longitudinal direction. FIG. 19B is a cross sectional view at the line along the longitudinal direction, and shows the movement of the developer in the longitudinal direction in the development chamber 31*b* in the periphery of the supply roller 33 of the development unit 30.

As shown in FIG. 19A, the developer to be accommodated in the developer accommodation chamber 31*a* has its own weight applied in an arrow Z direction, and hence it becomes more compact as it moves toward the development chamber 31*b*. Further, the sheet member 35*a* of the stirring unit 35 comes in contact with the wall surface portion 201*e* of the opening 201, and rotates in an arrow Q direction while bending. As a result, the developer in the developer accommodation chamber 31*a* is fed in an arrow R direction with stirring inside the accommodation chamber. Particularly, at the central portion in the longitudinal direction, the amount of the developer to be fed from the developer accommodation chamber 31*a* to the development chamber 31*b* tends to be larger than at the end. Incidentally, in FIG. 19A, the tip (the end on the side not coupled with the shaft) of the sheet member 35*a* moves while being in contact with the opening 201 when passing through the vicinity of the opening 201. However, the length of the sheet member 35*a* may be shorter than this so long as the developer can be stirred. The length of the sheet member 35*a* may be just large enough that the tip does not come in contact with the opening 201 when it passes through the vicinity of the opening.

On the other hand, the developer in the development chamber 31*b* is included in the supply roller 33 from the inlet portion 202*a*. The developer included in the supply roller 33 is discharged from the outlet portion 202*b*, thereby circulating the developer in the development chamber 31*b*. The action of the supply roller 33 is referred to as the "breath of the supply roller 33". Incidentally, in the present Example, in order to show the action of the supply roller 33 and the movement of the developer, a description has been given by distinguishing the contact region 202, the inlet portion 202*a*, and the outlet portion 202*b*. However, in actuality, respective locations are not clearly separable. For this reason, for describing the positional relationship and the acting direction in the present invention, these are not supposed to be distinguished and limited.

Further, referring to FIG. 19B, a description will be given to the movement of the development in the longitudinal direction of the supply roller in the development chamber 31*b*. Of the developers in the development chamber 31*b*, the developer that was not included in the supply roller 33 in the vicinity of the inlet portion 202*a* by the rotation of the supply roller 33 is fed to the longitudinal end of the process cartridge (in the arrow S direction).

As described up to this point, the developer is circulated, and generally, the circulation of the developer is more preferably performed smoothly. However, an increase in weight of the developer in the developer accommodation chamber 31*a* results in the compaction of the lower part in the gravity direction in the developer accommodation chamber 31*a*. As a result, the amount of the developer to be fed to the development chamber 31*b* increases. Particularly, at the central portion in the longitudinal direction, the effect tends to increase. Then, in the development chamber 31*b*, the previous developer fed from the developer accommodation chamber 31*a* compacts the vicinity of the outlet portion 202*b* with the developer. This makes the "breath of the supply roller" impossible. As a result, the amount of the developer accumulated in the vicinity of the inlet portion 202*a* to be fed to the longitudinal end of the process cartridge (in the arrow S direction) by the rotation of the supply roller 33 increases.

Then, at the end in the longitudinal direction of the development chamber 31*b*, the circulation of the developer is less. For this reason, the developer becomes compact. As a result, an image defective due to toner deterioration may be caused.

Effect of the Present Invention

In consideration of the circulation of the developer described above, as shown in FIGS. 1A and 1B, the satisfaction of the relationship of distance L1<distance L2 can reduce the amount of the developer to be transported into the development chamber 31*b* from the developer accommodation chamber 31*a* at the central portion in the longitudinal direction. As a result, it is possible to make proper the amount of the developer staying in the vicinity of the inlet portion 202*a* of the supply roller 33 in the development chamber 31*b*. For this reason, it is possible to suppress the amount of the developer to be fed to each longitudinal end of the supply roller 33 in the development chamber 31*b* (the arrow S direction (see FIGS. 19A and 19B)) by the rotation of the supply roller 33.

Further, as shown in FIG. 18B, at the central portion in the longitudinal direction, the position of the first end 201*a* is set at downstream in the rotation direction of the line L3. With this configuration, at the central portion in the longitudinal direction, the direction in which the transport force F1 of the developer by the sheet member 35*a* of the stirring unit 35 acts can be shifted from the direction toward the outlet portion 202*b*. For this reason, it is possible to more effectively reduce the amount of the developer to be transported into the development chamber 31*b* from the developer accommodation chamber 31*a* by the transport force of the stirring unit 35 at the longitudinal central portion of the supply roller.

On the other hand, as shown in FIG. 18A, at the opposite ends in the longitudinal direction, the position of the second end 201*b* is set at upstream of the line L3 in the rotation direction. With this configuration, the direction in which the transport force F2 of the tip portion 35*b* of the bent sheet member 35*a* acts can be turned in the direction of the outlet portion 202*b* of the supply roller 33. Further, the tip portion 35*b* of the sheet member 35*a* can enter the inside of the development chamber 31*b*. As a result, the developer can be effectively circulated in the development chamber 31*b* at both ends in the longitudinal direction.

Further, as shown in FIG. 20, by satisfying the relationship of distance L4<distance L5 for the size of the opening 201, it is possible to reduce the amount of the developer to be transported into the development chamber 31*b* from the developer accommodation chamber 31*a* at the central portion in the longitudinal direction to which the amount of the developer to be fed tends to be large. For this reason, it is possible to make the circulation of the whole development unit proper.

Up to this point, by achieving the configuration of the present Example, it is possible to provide a development unit that can make proper the circulation balance of the developer in the development unit, and that does not undergo the leakage of the developer or an image detriment due to a circulation failure.

Figure 21A:
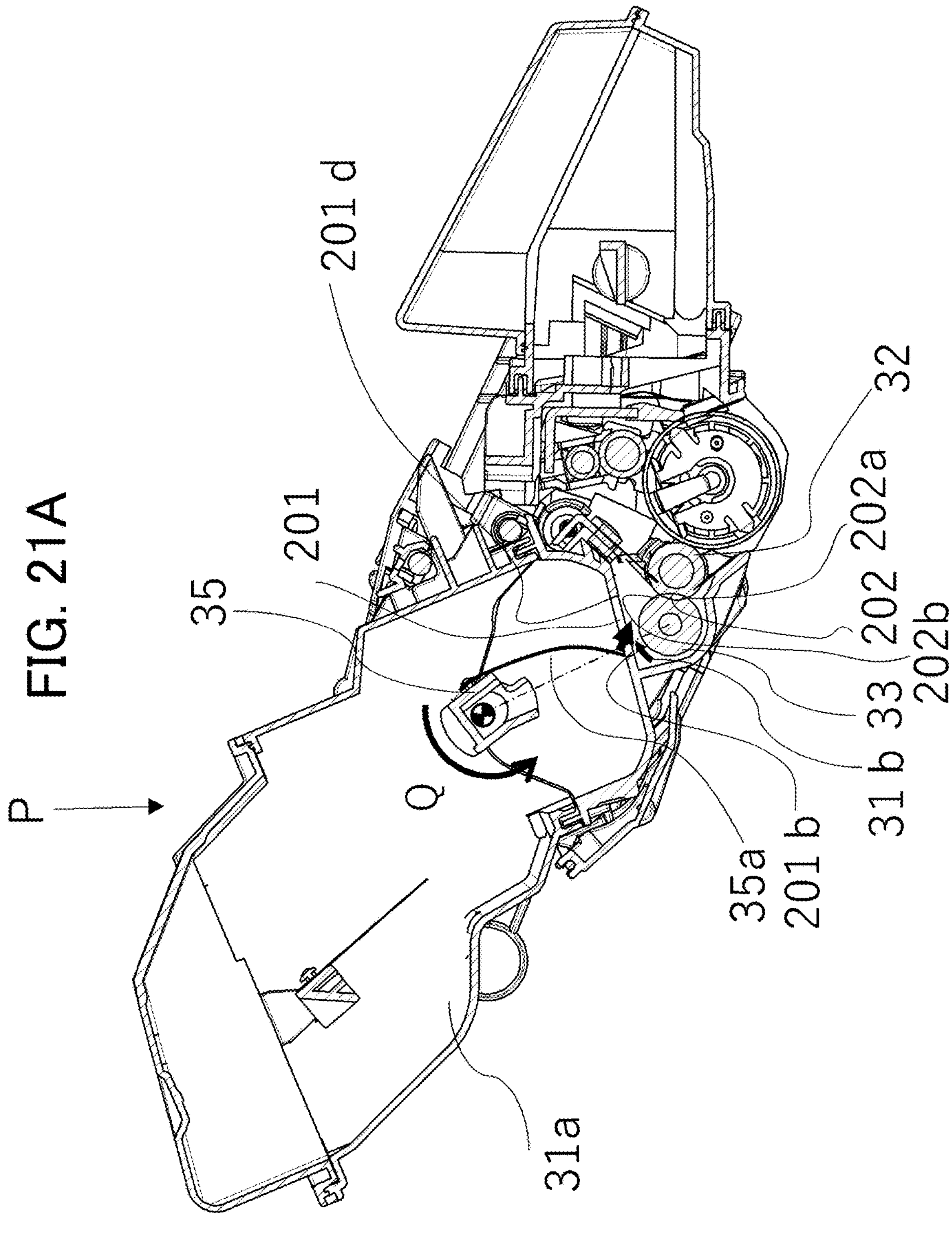
FIG. 21A is a cross sectional view showing a shape of an opening of a development unit in accordance with another example.
Figure 21B:
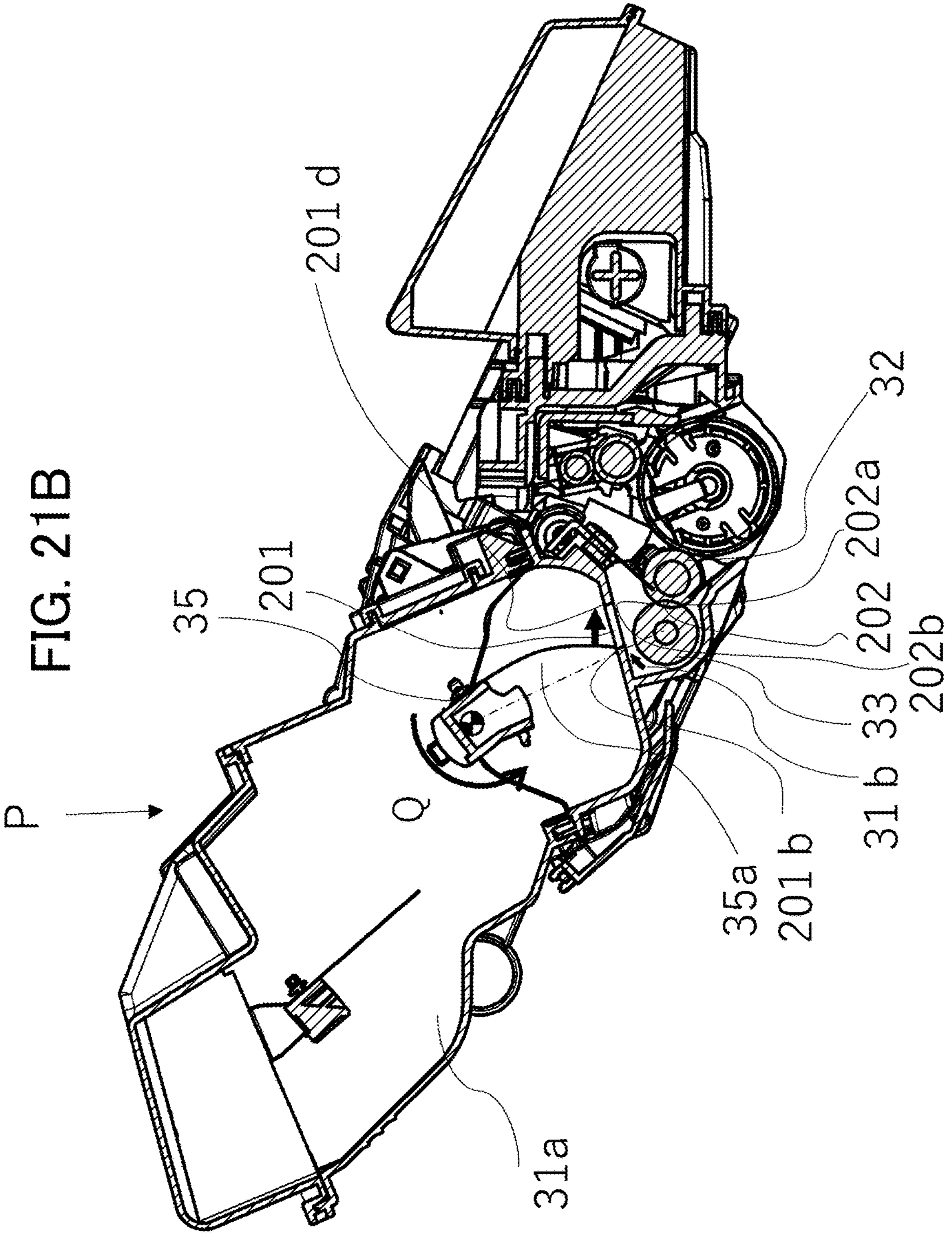
FIG. 21B is a cross sectional view showing a shape of an opening of a development unit in accordance with still another example.

Incidentally, the present invention is not limited to the replenishment configuration including the process cartridge and the toner cartridge previously described. As shown in FIGS. 21A and 21B, the same effect is also expected for an integral type cartridge including the process cartridge and the toner cartridge integrally. FIGS. 21A and 21B are each a cross sectional view showing the shape of the opening 201 with an all-in-one cartridge configuration in which the developer accommodation chamber 31*a* is filled with a large volume of a developer, including the same configuration as that of the present example therein. Such an integral type configuration can also provide the effect of making the circulation of the developer proper.

As described up to this point, with the configuration described in the present specification, in the development unit configuration in which the developer accommodation chamber having a stirring unit is set at the top in the gravity direction of the development chamber, even when the weight of the developer increases, it is possible to keep the circulation of the developer proper. Namely, the opening coupling the developer accommodation chamber and the development chamber is in the shape that allows the developer to pass therethrough more easily at the ends in the longitudinal direction than at the central portion. Thus, by making the position and the shape of the opening different between at the ends in the longitudinal direction and at the central portion, it is possible to properly circulate the developer. Typically, for example, as described in FIGS. 20, 22A, and 22B, it is configured such that the frontage is wider at each end in the longitudinal direction than at the central portion. However, it is essential only that the shape of the opening is the shape that allows the developer to pass more easily at each end in the longitudinal direction than at the central portion. For example, it is only required that a part of the end has a portion with a larger frontage than that of the central portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-033700, filed on Mar. 6, 2024, which is hereby incorporated by reference herein in its entirety.

What is claimed is:

1. A developing apparatus comprising:

a developer roller for bearing a developer;

a supply roller for coming in contact with the developer roller, thereby forming a contact region, and supplying the developer to a surface of the developer roller in the contact region;

a development chamber including the developer roller and the supply roller arranged therein;

a developer accommodation chamber for accommodating the developer; and a stirring unit having a shaft, and a sheet member held by the shaft, the sheet member stirring the developer accommodated in the developer accommodation chamber by rotation of the shaft, wherein, the developer accommodation chamber is set at a top in a gravity direction of the development chamber in a posture in which the developing apparatus is mounted in an image forming apparatus, the developer roller, the supply roller, and the stirring unit are rotatable around respective rotation axes along a longitudinal direction of the developing apparatus as a center, a wall surface for partitioning the developer accommodation chamber and the development chamber is provided with an opening for enabling a movement of the developer from the developer accommodation chamber to the development chamber along the longitudinal direction, in a cross section in the longitudinal direction, the opening has an end on an upstream side and an end on a downstream side in a direction of passage of the sheet member according to rotation of the stirring unit, and a distance between a first end and a contact region of the developer roller and the supply roller is shorter than a distance between a second end and the contact region where the first end represents the end on the upstream side at a central portion in the longitudinal direction, and the second end represents the end on the upstream side at an end in the longitudinal direction, in the cross section in longitudinal direction, the first end is situated on a downstream side in a rotation direction of the stirring unit than a line connecting a rotation center of the shaft and a rotation center of the supply roller, and the second end is situated on an upstream side in the rotation direction of the stirring unit than the line connecting the rotation center of the shaft and the rotation center of the supply roller.

2. The developing apparatus according to claim 1, wherein the sheet member of the stirring member has flexibility, a distance between a rotation center of the shaft and a free tip portion of the sheet member when the sheet member has no flexure is longer than a distance between the rotation center and the wall surface, and the sheet member rotates while coming in contact with the wall surface.

3. The developing apparatus according to claim 2, wherein the sheet member can enter the opening at the end in the longitudinal direction, and does not enter the opening at the central portion in the longitudinal direction.

4. The developing apparatus according to claim 1, wherein in the cross section in the longitudinal direction, a distance between the first end at the central portion in the longitudinal direction and a third end is shorter than a distance between the second end at the end in the longitudinal direction and a fourth end where the third end represents an end on the downstream side at the central portion in the longitudinal direction of the opening, and the fourth end represents an end on the downstream side at the end in the longitudinal direction.

5. An image forming apparatus comprising:

a developer roller for bearing a developer;

a supply roller for coming in contact with the developer roller, thereby forming a contact region, and supplying the developer to a surface of the developer roller in the contact region;

a development chamber including the developer roller and the supply roller arranged therein;

a developer accommodation chamber for accommodating the developer;

a stirring unit having a shaft, and a sheet member held by the shaft, the sheet member stirring the developer accommodated in the developer accommodation chamber by rotation of the shaft; and an image bearing roller for developing an electrostatic latent image formed on a surface when the developer is supplied from the developer roller, wherein, the developer accommodation chamber is set at a top in a gravity direction of the development chamber, the developer roller, the supply roller, and the stirring unit are each rotatable around respective rotation axes along a longitudinal direction as a center, a wall surface for partitioning the developer accommodation chamber and the development chamber is provided with an opening for enabling a movement of the developer from the developer accommodation chamber to the development chamber along the longitudinal direction, in a cross section in the longitudinal direction, the opening has an end on an upstream side and an end on a downstream side in a direction of passage of the sheet member according to rotation of the stirring unit, and a distance between a first end and a contact region of the developer roller and the supply roller is shorter than a distance between a second end and the contact region where the first end represents the end on the upstream side at a central portion in the longitudinal direction, and the second end represents the end on the upstream side at an end in the longitudinal direction, in the cross section in the longitudinal direction, the first end is situated on a downstream side in a rotation direction of the stirring unit than a line connecting a rotation center of the shaft and a rotation center of the supply member, and the second end is situated on an upstream side in the rotation direction of the stirring unit than the line connecting a rotation center of the shaft and the rotation center of the supply member.

6. A developing apparatus comprising:

a developer roller for bearing a developer;

a supply roller for coming in contact with the developer roller, thereby forming a contact region, and supplying the developer to a surface of the developer roller in the contact region;

a development chamber including the developer supply and the supply roller arranged therein;

a developer accommodation chamber for accommodating the developer; and a stirring unit having a shaft, and a sheet member held by the shaft, the sheet unit stirring the developer accommodated in the developer accommodation chamber by rotation of the shaft, wherein, the developer accommodation chamber is set at a top in a gravity direction of the development chamber in a posture in which the developing apparatus is mounted in an image forming apparatus, the developer roller, the supply roller, and the stirring unit are each rotatable around respective rotation axes along a longitudinal direction of the developing apparatus as a center, a wall surface for partitioning the developer accommodation chamber and the development chamber is provided with an opening for enabling a movement of the developer from the developer accommodation chamber to the development chamber along the longitudinal direction, in a cross section in the longitudinal direction, the opening has an end on an upstream side and an end on a downstream side in a direction of passage of the sheet member according to rotation of the stirring unit, and a width between the end on the upstream side and the end on the downstream side at a central portion in the longitudinal direction is narrower than a width between the end on the upstream side and the end on the downstream side at the ends in the longitudinal direction, in a cross section in the longitudinal direction, where a first end represents the end on the upstream side at a central portion in the longitudinal direction, and a second end represents the end on the upstream side at the end in the longitudinal direction, the first end is situated on a downstream side in a rotation direction of the stirring unit than a line connecting a rotation center of the shaft and a rotation center of the supply member, and the second end is situated on an upstream side in the rotation direction of the stirring unit than the line connecting a rotation center of the shaft and the rotation center of the supply member.

* * * * *